US010789567B1

(12) United States Patent
    Ur

(10) Patent No.: US 10,789,567 B1
(45) Date of Patent: Sep. 29, 2020

(54) DRONE BASED DELIVERY SYSTEM USING VEHICLES

(71) Applicant: SHMUEL UR INNOVATION LTD, Shorashim (IL)

(72) Inventor: Shmuel Ur, Shorashim (IL)

(73) Assignee: SHMUEL UR INNOVATION LTD, Shorashim (IL)

( * ) Notice: Subject to any disclaimer, the term of this patent is extended or adjusted under 35 U.S.C. 154(b) by 0 days.

(21) Appl. No.: 16/295,916

(22) PCT Filed: Sep. 25, 2017

(86) PCT No.: PCT/IL2017/051071
    § 371 (c)(1),
    (2) Date: Mar. 7, 2019

(87) PCT Pub. No.: WO2018/065977
    PCT Pub. Date: Apr. 12, 2018

Related U.S. Application Data

(60) Provisional application No. 62/405,275, filed on Oct. 7, 2016.

(51) Int. Cl.
    *G06Q 10/08* (2012.01)
    *G01C 21/34* (2006.01)
    (Continued)

(52) U.S. Cl.
    CPC ....... *G06Q 10/0832* (2013.01); *B64C 39/024* (2013.01); *G01C 21/3469* (2013.01);
    (Continued)

(58) Field of Classification Search
    CPC ............. G06Q 10/0832; G06Q 10/047; G06Q 10/08355; B64C 39/024; B64C 2201/128; B64C 2201/141; G01C 21/3469
    See application file for complete search history.

(56) References Cited

U.S. PATENT DOCUMENTS

| 8,140,592 B2 * | 3/2012 | Scott ...................... G06Q 10/00 707/805 |
| 8,498,947 B1 * | 7/2013 | Haake .................. G06Q 10/047 705/338 |

(Continued)

FOREIGN PATENT DOCUMENTS

| CN | 103914076 B | 2/2017 |
| WO | 2015/143977 A1 | 10/2015 |

OTHER PUBLICATIONS

Chase Murray, "The flying sidekick traveling salesman problem: Optimization of drone-assisted parcel delivery", published by Elsevier. com on Mar. 25, 2015 (Year: 2015).*

(Continued)

*Primary Examiner* — Kevin H Flynn
*Assistant Examiner* — Omar Zeroual
(74) *Attorney, Agent, or Firm* — Robert Goozner

(57) ABSTRACT

A method for determining a route for a drone to deliver a package from an origin to a destination using vehicles that are not actively participating in a delivery of the package; a method for delivering the package from the origin to the destination using in the drone in accordance with the route; a method for determining a route for delivering a package from an origin to a destination using plurality of drones and vehicles that are not actively participating in a delivery of the package; a method for delivering the package from the origin to the destination using the plurality of drones and vehicles in accordance with the route; a vehicle-associated package repository, for retaining packages deposited and collected by a drone, to be transported by a vehicle; and a vehicle-transported container comprising the vehicle-associated package repository.

6 Claims, 11 Drawing Sheets

(51) Int. Cl.
*G06Q 10/04* (2012.01)
*B64C 39/02* (2006.01)

(52) U.S. Cl.
CPC ..... *G06Q 10/047* (2013.01); *G06Q 10/08355* (2013.01); *B64C 2201/128* (2013.01); *B64C 2201/141* (2013.01)

(56) References Cited

U.S. PATENT DOCUMENTS

| | | | | |
|---|---|---|---|---|
| 8,511,606 | B1* | 8/2013 | Lutke | B64C 39/028 244/100 R |
| 8,825,226 | B1* | 9/2014 | Worley | A63J 1/00 701/2 |
| 8,989,053 | B1* | 3/2015 | Skaaksrud | G06K 7/10366 370/255 |
| 8,989,922 | B2* | 3/2015 | Jones | G05D 1/0088 701/3 |
| 9,022,324 | B1* | 5/2015 | Abhyanker | B64C 13/20 244/189 |
| 9,056,676 | B1* | 6/2015 | Wang | B64F 1/00 |
| 9,125,987 | B2* | 9/2015 | Levien | G05D 1/00 |
| 9,387,928 | B1* | 7/2016 | Gentry | G08G 5/0039 |
| 9,523,986 | B1* | 12/2016 | Abebe | G08G 5/0034 |
| 9,527,587 | B2* | 12/2016 | Levien | B64C 39/024 |
| 9,536,216 | B1* | 1/2017 | Lisso | B65B 35/56 |
| 9,561,852 | B1* | 2/2017 | Beaman | B64D 1/00 |
| 9,659,502 | B1* | 5/2017 | Abebe | G08G 5/0034 |
| 9,778,653 | B1* | 10/2017 | McClintock | B67D 7/0401 |
| 9,792,576 | B1* | 10/2017 | Jamjoom | G06Q 10/0832 |
| 9,828,092 | B1* | 11/2017 | Navot | G06Q 10/08355 |
| 9,897,457 | B2* | 2/2018 | Bryson | G01C 21/343 |
| 9,928,749 | B2* | 3/2018 | Gil | B64D 1/22 |
| 10,043,398 | B2* | 8/2018 | Akselrod | G08G 5/0013 |
| 10,081,263 | B2* | 9/2018 | Kim | B64C 39/024 |
| 10,207,591 | B2* | 2/2019 | Ng | B64C 39/024 |
| 10,207,820 | B2* | 2/2019 | Sullivan | B64F 1/22 |
| 10,351,239 | B2* | 7/2019 | Di Benedetto | G08G 5/0069 |
| 10,364,025 | B2* | 7/2019 | Krishnamoorthy | B64C 39/024 |
| 10,403,062 | B2* | 9/2019 | Rephlo | G06Q 10/083 |
| 10,454,564 | B2* | 10/2019 | Sham | H04W 72/04 |
| 10,454,576 | B2* | 10/2019 | Sham | H04B 7/155 |
| 2002/0165649 | A1* | 11/2002 | Wilhelm Rekow | A01B 69/008 701/26 |
| 2004/0111280 | A1* | 6/2004 | Ohtani | G06Q 10/02 705/1.1 |
| 2012/0271758 | A1* | 10/2012 | Jammer | B60L 50/66 705/39 |
| 2013/0240673 | A1* | 9/2013 | Schlosser | B64D 1/02 244/137.1 |
| 2014/0032034 | A1* | 1/2014 | Raptopoulos | G05D 1/0088 701/25 |
| 2014/0088804 | A1* | 3/2014 | Hyde | H02J 7/025 701/22 |
| 2014/0129059 | A1* | 5/2014 | Scarlatti | G05D 1/00 701/16 |
| 2014/0254896 | A1* | 9/2014 | Zhou | G07F 17/12 382/124 |
| 2014/0330456 | A1* | 11/2014 | Lopez Morales | G05D 1/0022 701/3 |
| 2015/0102154 | A1* | 4/2015 | Duncan | G05D 1/0094 244/2 |
| 2015/0183528 | A1 | 7/2015 | Walsh et al. | |
| 2015/0370251 | A1* | 12/2015 | Siegel | G05D 1/0684 701/2 |
| 2015/0379468 | A1* | 12/2015 | Harvey | G06Q 10/08355 705/338 |
| 2016/0009413 | A1* | 1/2016 | Lee | B64F 1/007 701/16 |
| 2016/0027261 | A1* | 1/2016 | Motoyama | G08B 5/36 340/313 |
| 2016/0068264 | A1* | 3/2016 | Ganesh | G01S 19/42 701/2 |
| 2016/0107750 | A1* | 4/2016 | Yates | B64C 39/024 244/2 |
| 2016/0185466 | A1* | 6/2016 | Dreano, Jr. | G06Q 30/0635 705/26.81 |
| 2016/0196756 | A1* | 7/2016 | Prakash | G08G 5/025 701/3 |
| 2016/0200438 | A1* | 7/2016 | Bokeno | G05D 1/102 244/2 |
| 2016/0253908 | A1* | 9/2016 | Chambers | G05D 1/101 701/2 |
| 2016/0257401 | A1* | 9/2016 | Buchmueller | G01C 21/343 |
| 2016/0257423 | A1* | 9/2016 | Martin | B64F 1/00 |
| 2016/0364823 | A1* | 12/2016 | Cao | G06Q 50/30 |
| 2017/0011340 | A1* | 1/2017 | Gabbai | G06Q 10/0836 |
| 2017/0090484 | A1* | 3/2017 | Obaidi | B64D 47/08 |
| 2017/0120890 | A1* | 5/2017 | Payne | G01C 21/3492 |
| 2017/0139424 | A1* | 5/2017 | Li | G06Q 10/083 |
| 2017/0345317 | A1* | 11/2017 | Heinonen | G01C 21/20 |
| 2017/0355459 | A1* | 12/2017 | Erickson | B64C 39/024 |
| 2018/0072416 | A1* | 3/2018 | Cantrell | G05D 1/0027 |
| 2018/0074488 | A1* | 3/2018 | Cantrell | G07C 5/008 |
| 2018/0074523 | A1* | 3/2018 | Cantrell | B64C 1/22 |
| 2018/0086452 | A1* | 3/2018 | Hunt | G06Q 10/0835 |
| 2018/0107204 | A1* | 4/2018 | Mikan | G08G 1/205 |
| 2018/0165973 | A1* | 6/2018 | Chun | G08G 5/025 |
| 2018/0184269 | A1* | 6/2018 | Christoval | H04W 4/38 |
| 2018/0236840 | A1* | 8/2018 | Cantrell | G05D 23/1917 |
| 2018/0276994 | A1* | 9/2018 | Dukatz | G06N 5/003 |
| 2018/0276995 | A1* | 9/2018 | Priest | G08G 5/0034 |
| 2018/0292817 | A1* | 10/2018 | Yang | G08G 5/0013 |
| 2018/0364740 | A1* | 12/2018 | Collins | G05D 1/0684 |
| 2019/0034877 | A1* | 1/2019 | Cantrell | G05D 1/0291 |
| 2019/0039731 | A1* | 2/2019 | Marcath | B64F 1/007 |
| 2019/0043000 | A1* | 2/2019 | Wang | B64C 39/024 |
| 2019/0043370 | A1* | 2/2019 | Mulhall | B64D 1/08 |
| 2019/0101934 | A1* | 4/2019 | Tuukkanen | G01C 21/20 |
| 2019/0103032 | A1* | 4/2019 | Sasaki | G08G 5/025 |
| 2019/0108472 | A1* | 4/2019 | Sweeney | B64C 39/024 |
| 2019/0114564 | A1* | 4/2019 | Ferguson | G06Q 10/06312 |
| 2019/0126769 | A1* | 5/2019 | Schmalzried | G08G 5/0069 |
| 2019/0135403 | A1* | 5/2019 | Perry | B64C 1/068 |
| 2019/0212735 | A1* | 7/2019 | Fujiwara | G05D 1/0212 |
| 2019/0220819 | A1* | 7/2019 | Banvait | G05D 1/0088 |
| 2019/0235502 | A1* | 8/2019 | Lindsey | B64D 45/04 |
| 2019/0235526 | A1* | 8/2019 | Chen | G05D 1/0206 |
| 2019/0258264 | A1* | 8/2019 | Bash | G05D 1/102 |
| 2019/0259120 | A1* | 8/2019 | Mattingly | G05D 1/0027 |
| 2019/0265705 | A1* | 8/2019 | Zhang | G05D 1/0005 |
| 2019/0295035 | A2* | 9/2019 | Radetzki | G06Q 10/08355 |

OTHER PUBLICATIONS

Miae Kim, "A Cost-Optimization Model in Multi-Agent Ssytem Routing for Drone Delivery", published by Springlink.com on May 28, 2017 (Year: 2017).*
https://www.wired.com/2016/08/crafty-ideas-make-drone-deliveries-work-everybody/.
http://www.telegraph.co.uk/technology/2016/07/26/amazon-to-step-up-uk-tests-of-delivery-drones/.
https://www.autoevolution.com/news/researchers-create-drone-that-can-land-on-moving-vehicle-video-85516.html.

* cited by examiner

DRONE BASED DELIVERY SYSTEM USING VEHICLES

CROSS-REFERENCE TO RELATED APPLICATIONS

This application claims the benefit of U.S. provisional Application No. 62/405,275 filed Oct. 7, 2016, which is hereby incorporated by reference in its entirety, without giving rise to disavowment.

TECHNICAL FIELD

The present disclosure relates to delivery systems in general, and to drone based delivery systems, in particular.

BACKGROUND

Drone technology is growing increasingly popular, as daily uses for drones become more mainstream. From delivering packages to delivering medical aids, drones are now a part of our everyday lives.

Package delivery such as delivery of parcels, or high value mail as single shipments, is a service that is provided by most postal systems, express mail, private courier companies, or the like. Advanced delivery system has recently started using delivery drones to perform the package delivery. Such drones may be unmanned aerial vehicles utilized to transport packages, parcels, food or other goods, eliminating both wait times and the cost of human labor.

With the rapid demise of snail mail and the explosive growth of e-commerce, postal companies have been forced to seek new ways to expand beyond their traditional letter delivery business models. Given the online consumer expectation of fast parcel delivery, different postal service companies around the world started using drones to deliver their parcels.

Drones are further used to transport medicines and vaccines, and retrieve medical samples, into and out of remote or inaccessible regions. As an example, "Ambulance drones" are used to rapidly deliver defibrillators in the crucial few minutes after cardiac arrests, and include livestream communication capability allowing paramedics to remotely observe and instruct on-scene individuals in how to use the defibrillators.

BRIEF SUMMARY

One exemplary embodiment of the disclosed subject matter is a method comprising: obtaining a delivery data of a package to be transported by a drone, wherein the delivery data comprises an origin and a destination of the package; obtaining a schedule of a plurality of vehicles, wherein the schedule comprises a schedule of each vehicle of the plurality of vehicles, wherein one or more vehicles of the plurality of vehicles is capable of transporting the drone thereon; determining, based on the delivery data and the schedule, a route for the drone to deliver the package, wherein the route begins at the origin, wherein the route ends at the destination, wherein the route comprises a plurality of legs, wherein in accordance with the route in a first portion of the plurality of legs the drone is planned to fly, and wherein in each leg of a second portion of the plurality of legs the drone is planned to ride on a different vehicle; and providing the route to the drone, whereby the drone delivers the package while performing the plurality of legs.

Optionally, the vehicles of the plurality of vehicles are not actively participating in a delivery of the package, wherein each vehicle of the plurality of vehicles is performing another task that is independent from the delivery of the package.

Optionally, the route comprises a first leg, a second leg and a third leg, wherein in accordance with the route the first leg immediately precedes the second leg and the second leg immediately precedes the third leg; wherein in the first leg, the drone is planned to be transported by a first vehicle; wherein in the second leg, the drone is planned to fly from the first vehicle to a second vehicle, wherein in the third leg, the drone is planned to be transported by the second vehicle.

Optionally, the second leg, the drone is planned to make a stop at a stationary location after flying off from the first vehicle and before flying on to the second vehicle.

Optionally, the drone is planned to utilize at least a portion of the vehicles for charging a power source of the drone.

Optionally, said determining is further performed based on an initial energy level of a power source of the drone, based on expected power consumption of the drone at each leg, and based on expected charging of the power source at each leg, whereby the route is planned so as to be feasible for the drone in view of energy available to the drone.

Optionally, said determining is further performed based on weather conditions, whereby the route is planned so as the drone is planned to ride on a vehicle when a weather condition prevents the drone from flying.

Optionally, the delivery data comprises characteristics of the drone, wherein said determining is further based on the characteristics of the drone.

Optionally, the delivery data comprises characteristics of the package, wherein said determining is further based on the characteristics of the package.

Another exemplary embodiment of the disclosed subject matter is a method for delivering a package from an origin to a destination using a drone, wherein the method comprising: obtaining a route for the drone to deliver the package, wherein the route begins at the origin, wherein the route ends at the destination, wherein the route comprises a plurality of legs, wherein in accordance with the route in a first portion of the plurality of legs the drone is planned to fly, wherein in each leg of the first portion of the plurality of legs, the drone is planned to fly from an initial waypoint to a target waypoint, wherein in each leg of a second portion of the plurality of legs the drone is planned to ride on a different vehicle; and repeatedly flying the drone in accordance with the first portion of the plurality of legs, wherein in each leg of the first portion of the plurality of legs, the drone is being flown from a first landing location to a second landing location, wherein the first landing location is located at the initial waypoint of the each leg, wherein the second landing location is located at the target waypoint of the each leg, wherein at least one landing location is associated with a vehicle, wherein the drone is transported by the vehicle in accordance with a leg of the second portion of the plurality of legs.

Optionally, the vehicles of the plurality of vehicles are not actively participating in a delivery of the package, wherein each vehicle of the plurality of vehicles is performing another task that is independent from the delivery of the package.

Optionally, the route comprises a first leg, a second leg and a third leg, wherein the first leg immediately precedes the second leg, wherein the second leg immediately precedes the third leg, wherein in the first leg, the drone is transported by a first vehicle from an initial waypoint of the first leg to a target waypoint of the first leg; wherein in the second leg, the drone is not transported by any vehicle and is set to fly from an initial waypoint of the second leg located on the first vehicle to a target waypoint of the second leg located on a second vehicle; wherein in the third leg, the drone is transported from an initial waypoint of the third leg to a target waypoint of the third leg by the second vehicle.

Optionally, during executing the second leg, the drone stops at a stationary location after leaving the initial waypoint of the second leg and before reaching the target waypoint of the second leg.

Yet another exemplary embodiment of the disclosed subject matter is a method comprising: obtaining a delivery data of a package, wherein the delivery data comprises an origin and a destination of the package; obtaining a schedule of a plurality of vehicles, wherein the schedule comprises a schedule of each vehicle of the plurality of vehicles, wherein each vehicle of the plurality of vehicles is capable of transporting a package that is deposited and collected autonomously by one or more autonomous drones without intervention of the vehicle or person riding thereon, wherein vehicles of the plurality of vehicles are not actively participating in a delivery of the package, wherein each vehicle of the plurality of vehicles is performing another task that is independent from the delivery of the package; determining, based on the schedule, a route for delivering the package; wherein the route begins at the origin; wherein the route ends at the destination, wherein the route comprises a plurality of legs; wherein in each leg of a first portion of the plurality of legs, the package is planned to be transported by a different drone; wherein in each leg of a second portion of the plurality of legs, the package is planned to be transported on a different vehicle; wherein the plurality of legs comprises a first leg, a second leg and a third leg; wherein in the first leg, the package is planned to be transported by a first drone to a vehicle; wherein in the second leg, the package is planned to be transported on the vehicle; wherein in the third leg, the package is planned to be transported from the vehicle by a second drone.

Optionally, the first drone and the second drone are different drones, wherein each different drone is local to a different area.

Optionally, the different drones are adapted in capabilities for the different areas.

Yet another exemplary embodiment of the disclosed subject matter is a method for a delivery of a package from an origin to a destination, wherein the method comprising: obtaining a route for the delivery of the package; wherein the route begins at the origin; wherein the rout ends at the destination; wherein the route comprises a plurality of legs, each of which beginning at an initial waypoint and ending at a target waypoint; wherein in each leg of a first portion of the plurality of legs, the package is planned to be transported by a different drone; wherein in each leg of a second portion of the plurality of legs, the package is planned to be transported on a different vehicle; transporting the package in accordance with the route; wherein in each leg of the first portion of the plurality of legs, the package is being transported by a different drone from an initial waypoint to a target waypoint; wherein, for each leg of the first portion, at least one waypoint that is selected from the initial waypoint of the each leg and the target waypoint of the each leg, is located on a vehicle; wherein the vehicle is not actively participating in a delivery of the package, wherein the package is transported on the vehicle in accordance with a leg of the second portion of the plurality of legs.

Yet another exemplary embodiment of the disclosed subject matter is a vehicle-associated package repository, wherein the vehicle-associated package repository comprising: an opening, wherein said opening is adapted in size and shape to allow depositing and collecting of a package by a drone; and a storage compartment, wherein said storage compartment is adapted in size and shape to retain a plurality of packages, wherein said storage compartment is configured to store packages deposited via said opening; wherein said vehicle-associated package repository is transported by a vehicle.

Optionally, the vehicle-associated package repository further comprising: a displacement component, wherein said displacement component is adapted in size and shape to move one or more packages from said opening to said storage compartment upon package deposit, and from said storage compartment to said opening upon package collection.

Optionally, said opening is located on a top of the vehicle-associated package repository, whereby allowing the drone to collect or deposit the package from the top of the vehicle, when said vehicle-associated package repository is mounted on or integrated with the vehicle.

Optionally, said vehicle-associated package repository is selectively mountable on the vehicle, wherein said vehicle-associated package repository is removable from the vehicle.

Optionally, said vehicle-associated package repository is mountable on a part of the vehicle selected from the group consisting of: a driver cabin of the vehicle, a cargo area of the vehicle and a removable container carried by the vehicle.

Optionally, a height of said vehicle-associated package repository, when mounted on the vehicle, does not exceed a predetermined height threshold defined by a structure of the vehicle.

Optionally, said vehicle-associated package repository is integrated with said vehicle.

Yet another exemplary embodiment of the disclosed subject matter is a vehicle-transported container comprising said vehicle-associated package repository and a container compartment, wherein said vehicle-associated package repository is integrated with said vehicle-transported container.

Optionally, said vehicle-associated package repository is positioned above said container compartment, wherein a total height of said vehicle-transported container is of a standard height of a standard vehicle-transported container, wherein the container compartment is of a height below a standard height of a container compartment of the standard vehicle-transported container.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
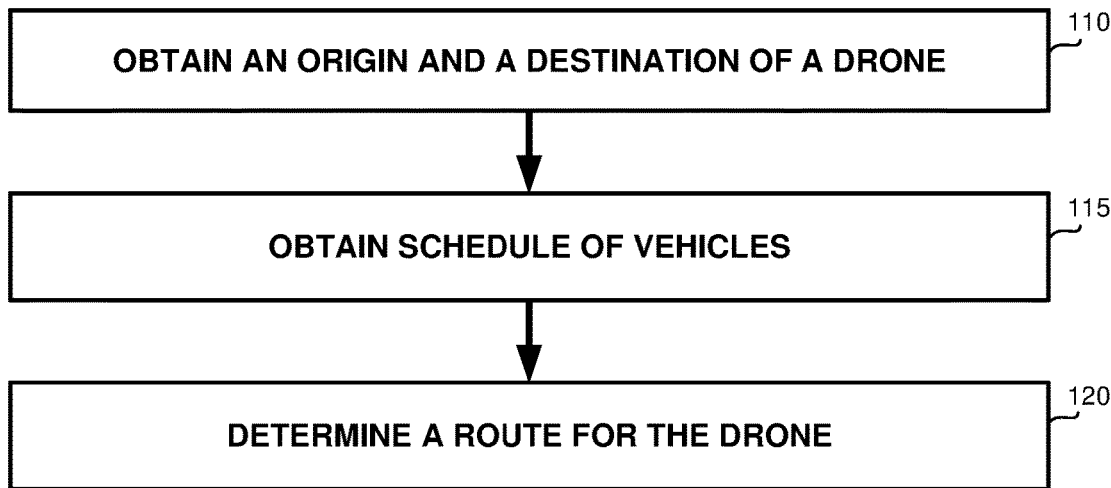
FIGS. 1A-1D show flowchart diagrams of methods, in accordance with some exemplary embodiments of the disclosed subject matter.

One technical problem dealt with by the disclosed subject matter is to improve drone based delivery. In particular, increasing the range of the drone based delivery system is desired, so as to not be limited by the limited range of the drones themselves. In some cases, increasing delivery capacity of the drone based system may be desired, such as to enable delivery of more parcels at a given time window. In some cases, the capacity is limited due to the flight speed of the drones used by the system. Additionally, or alternatively, the capacity is limited by the fact that a drone is associated with a parcel for the entire delivery task thereof.

With the growing use of drones for the delivery of packages, a plurality of problems with this method of delivery has been raised. One problem is the limitation on the range the drone can carry a package. The range of the drone may be effected by the weight of the carried package. The heavier the package, the shorter is the distance that the drone is able to fly carrying it. Furthermore, the drones may use a rechargeable power source, such as a battery. The maximum power capacity of the rechargeable power source may set a constraint on the drone's range. Though recharging may be possible for the drone mid-way, stopping for charging will generally delay delivery of the package.

Another technical problem is providing a drone-based delivery system that is capable of widespread delivery to various locations, given that drones may not be allowed to operate in every place. As an example, some federal laws prohibit commercial drones from flying over populated areas, over non-participating individuals, or the like. As another example, drones may not be allowed to fly near airplanes, in the vicinity of airports, or the like. Additional limitations on the operation of drones may exist. For example, there may be limitations on the times in which drones can be used, such as not be allowed to fly during night time, during twilight, or the like. As an additional example, the drones may not be permitted to operate during specific weather conditions, such as high winds, bad visibility, fog, rain, snow, icy conditions, or the like.

Yet another technical problem is to utilize vehicles that have a predefined task without causing them to go out of their way or do any additional work. A lot of vehicles, such as trucks, buses, trains, or the like, travel for long predetermined routes. Such vehicles may have predetermined schedules and routes. Additionally or alternatively, accurate routes and schedules of such vehicles may be known using route prediction with using Global Positioning System (GPS) data of the vehicles or computing devices associated with the vehicles, such as GPS-based navigation system utilized by the drivers. The vehicles may be designated to perform a task such as transporting passengers, transporting goods, or the like. In some exemplary embodiments, the task performed by each vehicle is not be affected by such utilization. The vehicles and the users of the vehicles, such as drivers, passengers, or the like, may not even be aware that the vehicle is being utilized for an additional task.

The vehicles may be a resource that can be utilized and is currently not being fully exploited. In some cases, rooftops of the vehicles are resources that are not being utilized at all, or only to a short degree.

In some exemplary embodiments, such vehicles may be members of one or more fleets. Each fleet may be managed by a fleet manager or transport manager, such as using fleet management software, manual fleet management, or any other management tool. The management tool may provide for a known schedule of each vehicle. The known schedule may include, for example, a planned location of each vehicle at different time points, a route of each vehicle, or the like. Additionally or alternatively, vehicles may be connected to a fleet telematics system that may provide updated and accurate information regarding the vehicle during the movement thereof. In particular, the real-time location of the vehicle may be tracked.

One technical solution is to utilize the roofs of the vehicles as landing pads for package delivery drones, without changing the original route of the vehicles. In some exemplary embodiments, roofs of vehicles, such as trucks, buses, trains, or the like, are generally flat and significantly larger than the average size of a drone. As a result, such roofs may be suitable for drones to land thereon. Landing pads may be attached, either permanently or temporarily, thereon. Furthermore, vehicles can drive for long distances, are not limited to drive in certain time frames or in specific areas, and accordingly may assist the drones in reaching locations that the drones are limited or prohibited from accessing. The drones may ride on the vehicles to increase their effective range, reach prohibited locations, transport packages in conditions that prevent or prohibit from the drone to fly, or the like.

In some exemplary embodiments, a landing pad for drones may be placed on the roof of a vehicle. A drone may be able to land on and takeoff the landing pad without affecting the movement of the vehicle. Additionally or alternatively, takeoff and landing may be performed when the vehicle stops, such as during scheduled stops, at junctions, at red lights, at stop signs, or the like. In some exemplary embodiments, the drone may be configured to connect to the system of the vehicle, such as a cruise control system, a navigation system, a messaging system relaying notifications to the driver, or the like, in order to get information regarding nearby or planned stops, or to request the vehicle to stop for landing, or the like. The vehicle may stop to allow the drone to land without changing the original route of the vehicle. As an example, the drone may request a public transportation bus to stop at a next station, similarly to a request by a passenger who may press an on-board button. As another example, the drone may request the vehicle to momentarily stop at a near-by location, such as a parking spot, a bus station, a side of the road, or the like, even if such a stop cannot be requested by a passenger. The vehicle may be an autonomous vehicle that is controlled by a control system which may enforce the requested stop. Additionally or alternatively, the vehicle may be a manned vehicle whose driver may honor the request. In some exemplary embodiments, manned vehicles may utilize control systems, such as cruise control systems, that can be used to enforce the request by limiting the vehicle's ability to continue driving using such control systems, reducing the maximal speed of the vehicle until the request is honored, or the like.

In some exemplary embodiments, the landing pad may be flat, such as with a thickness of up to 5 cm, 10 cm, 15 cm, or the like. The flat landing pad may not significantly add to the vehicle's height.

In some exemplary embodiments, the landing pad may be protected from wind, rain, or any other conditions that may affect the drone, the landing of the drone, anchorage of the drone to the landing pad, or the like. For example, in some cases, the drone may land on the landing pad to withstand weather conditions that the drone itself cannot withstand, until such time the weather conditions will change.

In some exemplary embodiments, the landing pad may be utilized to recharge the drone while landing thereon. In some exemplary embodiments, drones may utilize a rechargeable power source. In some exemplary embodiments, the landing pad may comprise a charger which is used by the drone for recharging. In some exemplary embodiments, the drone may connect to the charger, using a plug, a wire, a wireless connection, or the like. As an example, the drone may land with one leg on a negative charging stripe of the landing pad and the other on a positive charging stripe of the landing pad, completing an electrical circuit that is used to convey electric energy to the drone for charging. The drone may be charged using energy stored on or produced by the vehicle, such as by a battery of the vehicle, extra electrical power generated by an engine of the vehicle, or the like. Additionally or alternatively, solar panels may be placed on the roof of the vehicle, and connected to the landing pad to allow re-charging of drones landing thereon. Additionally or alternatively, the drone may be recharged by solar power. In some exemplary embodiments, solar panels may be placed on the wings of the drone. The solar panels may be utilized to charge the drone while riding on the vehicle. In some exemplary embodiments, the drone may utilize the time in which it rides the vehicle, and in which it need not fly, for recharging its power source, and thereby increase its effective range without delaying delivery due to the drone being stationary for charging.

In some exemplary embodiments, each vehicle may have one or more landing pads of different sizes for different types of drones. Each landing pad may be adapted to one or more types of drones. During landing, the drone may communicate with the landing pad, such as to retrieve the position of one another, to enable successful landing and docking. In some exemplary embodiments, each vehicle may have a limited number of landing pads on its top, such as one landing pad, two landing pads, or the like. Once a drone is planned to ride on the vehicle, the drone may reserve a landing pad on the vehicle. The landing pad will not be available for other drones for the relevant part of the route, which is reserved for the drone. In case the vehicle has more than one landing pad, the vehicle may still be available for other drones to land thereon, until all the landing pads are reserved. In some cases, the same vehicle may be used by several drones to ride on, in different parts of the vehicle's journey.

In some exemplary embodiments, a package delivery system in accordance with the disclosed subject matter may utilize drones and un-related vehicles for parcel delivery. In some exemplary embodiments, a drone, during its delivery, may ride on a vehicle. During landing on the vehicle, the drone may be turned off to save energy, and may potentially re-charge. Furthermore, by riding on the vehicle, the drone may extend the effective range in which it can deliver packages. The vehicle may not be actively participating in a delivery of the package. The vehicle may be performing another task that is independent from the delivery of the package, such as a delivery of other packages, transporting people, or the like.

In some exemplary embodiments, the package delivery system may operate with companies having fleets of vehicles, such as bus companies, train companies, boat fleets, delivery companies, companies utilizing their own fleet of vehicles for delivery of their own products, or the like. Vehicles of such fleets generally have known routes and their schedules are predetermined. Additionally or alternatively, private vehicles, having an appropriate roof for placing the landing pad, may be utilized. In some exemplary embodiments, assuming different types of landing pads are used for different types of drones, the types of drones that can land on each vehicle may be retained and used for route computation.

Another technical solution may be to determine a route for a drone delivering a package, which includes one or more legs in which the drone rides on different vehicles. In some exemplary embodiments, a route for a drone delivering a package from an origin point to a destination point may be determined. The route may be determined based on the schedule of the vehicles. The route may begin at the origin point and end at the destination point. In some exemplary embodiments, the package delivery system may schedule a route for a drone based on a graph of all potential legs that the drone may travel. The legs may include flying legs in permitted and feasible flying area, riding legs in which the drone rides a vehicle on top of which the drone can land, or the like. A route may be calculated from the graph using a route optimization algorithm, such as a shortest path algorithm, Dijkstra's algorithm, or the like. Characteristics of the drone, such as speed, range of flying, energy status, or the like, may be known to the system, and may be considered for determining the route.

In some exemplary embodiments, the route may comprise a plurality of legs. In a first portion of the plurality of legs the drone may be planned to fly. In a second portion of the plurality of legs the drone may be planned to ride on a vehicle. In some exemplary embodiments, the drone may be planned to ride on a different vehicle in each leg of the second portion of the plurality of legs. In some exemplary embodiments, the route may be provided to the drone, and the drone may deliver the package while performing the plurality of legs.

In some exemplary embodiments, the drone may be planned to use multiple vehicles in a single route. The drone may wait for the first vehicle to arrive and ride thereon. The first vehicle may transport the drone to a second stop where the drone can ride a second vehicle to a third stop. Additionally or alternatively, the drone may fly from the second stop to a different location to catch the second vehicle continuing to the drone's destination. Additionally or alternatively, the location where the drone is planned to land on the vehicle or takeoff from the vehicle may be approximated. In some cases, the drone may wait for a suitable opportunity, such as when the vehicle comes to a complete stop. The complete stop may be estimated to occur in bus stops, junctions, traffic lights, stop signs, or the like. However, in some cases, the vehicle may not stop at the estimated location, and the drone may wait for a suitable opportunity within the proximity of the planned location. Consider, for example, that a bus reaches a junction but need not stop due to the traffic light showing green light. As another example, a bus stop may be skipped due to lack of demand from the passengers. In such scenarios, the exact location where the drone actually lands on or takes off from the vehicle may be dynamically determined in view of the movement of the vehicle.

Yet another technical solution is to provide for an optimized route for single package delivery. The delivery of the package may be performed using multiple drones, vehicles or a combination thereof. In some exemplary embodiments, drones may co-operate with vehicles to deliver the package from an origin to a destination. The drones may be used to put packages on the vehicles, to move packages from one vehicle to another, to collect packages from vehicles, to deliver packages to locations that vehicles cannot enter, or the like. The vehicles may be used to transport packages from one waypoint to another, where another drone may collect the package. The vehicles may be utilize to extend the range of delivery, to increase speed of delivery as the speed of the vehicles is likely higher than that of the drones, to cross no-fly zones, or the like.

In some exemplary embodiments, a first drone may collect the package form the origin and drop the package on a top of a first vehicle. The first vehicle may transport the package to another location, which may potentially be unreachable to the first drone, such as in a different city, different delivery zone, crossing through a no-fly zone, associated with weather conditions in which the drone cannot properly operate, or the like. A second drone may collect the package from the first vehicle. The second drone may deposit the package on a second vehicle, to be delivered by the second vehicle to another waypoint. At the other waypoint, a third drone may collect the package and so forth. In the last leg, the last drone may drop the package at the destination.

As an example, if a package is sent from New-York City to Rochester in upstate New-York, the package may be collected from its origin by a drone. The drone may deposit the package on a vehicle driving in the direction of Rochester. Later a different drone in Rochester, may collect the package, and deliver it to its destination. Additionally or alternatively, the drone may ride on the vehicle from New-York City to Rochester, takeoff the vehicle in Rochester and deliver the package to the destination thereof.

In some exemplary embodiments, a central planning agent of the delivery system, may co-ordinate between the different drones participating in the delivery of the package. The central planning agent may have control on the drones. The central planning agent may plan the delivery route based on the schedule of the vehicles and the availability of the drones. Additionally or alternatively, a decentralized co-operating agent may coordinate between the different drones participating in the delivery of the package. In some exemplary embodiments, a bidding process between agents may be performed to determine potential drones to carry the package from one waypoint to another. In some exemplary embodiments, the route selected may be a possible route with the highest target function value, such as lowest cost if the participation of the drone is associated with a cost, shortest time, or the like. It will be noted that the bidding process may relate solely to legs where drones carry the package. Additionally or alternatively, the bidding process may relate solely to vehicles, making a reservation on a vehicle for transporting a package. In some exemplary embodiments, the planning may be performed by hybrid agents, where the decision regarding one of drones or vehicles is centralized, and the decision regarding the other is decentralized.

A yet another technical solution is to create a vehicle top storage facility for automatic storage of packages. The storage facility may be adapted for drones to connect thereto for collecting or depositing of packages thereon. In some exemplary embodiments, the storage facility may be constructed as an extension to the vehicle top. The storage facility may be utilized to store packages. In some cases, the storage facility may be adapted to retain packages of limited size, such as of size up to 30 cm×30 cm×30 cm, 50 cm×50 cm×50 cm, 70 cm×70 cm×70 cm, or the like. In some exemplary embodiments, the storage facility may be further used as a landing pad of drones. Additionally or alternatively, a landing pad may be placed on the top of the storage facility. In some exemplary embodiments, the storage facility may be configured to identify the drone, such as based on a Quick Response (QR) code printed on the drone, Radio-Frequency Identification (RFID), using a wireless communication protocol, or the like. When a drone arrives to the vehicle, the drone may identify itself and collect a relevant package from the storage facility. Additionally or alternatively, the drone may drop a package to be stored in the storage facility, land on storage facility, recharge, or the like.

In some exemplary embodiments, the storage facility may comprise an opening that is adapted in size and shape to allow depositing and collecting of a package by a drone. The opening may be located on a top of the storage facility in order to allow drones to collect or deposit packages from the top of the vehicle. Additionally or alternatively, the opening may be positioned in any other location that is accessible to the drone, such as a back of the vehicle, a side of the vehicle in a relatively top portion thereof (e.g., in the top most ⅔ of the side wall, at height of about 1.5 meters or higher, or the like). The storage facility may further comprise a storage compartment. The storage compartment may be adapted in size and shape to retain a plurality of packages. The storage compartment may be configured to store packages deposited in the opening.

In some exemplary embodiments, a displacement component within the storage facility may be utilized to collect packages from drones, or to pass packages to drones. The displacement component may be adapted in size and shape to move one or more packages from the opening of the storage facility to a storage compartment upon package deposit, and the storage compartment to the opening upon package collection. After identifying a drone willing to deliver a package to the storage delivery, the displacement component may take the package from the drone and pass it to the storage compartment of the storage facility. Additionally or alternatively, in case a drone is identified to be permitted to collect a package, the displacement component may pass the package from the storage compartment of the storage facility to the opening, whereby the drone can collect the package from the opening.

In some exemplary embodiments, the storage facility may be designed to be relatively flat in order to minimize the potential adverse effect on the vehicle's aerodynamics. As a non-limiting example, the height of the storage facility may be of about 10% of the vehicle's height, about 15% of the vehicle's height, about 20% of the vehicle's height, or the like. In some exemplary embodiments, the storage facility may be designed to be attached to the vehicle in a manner not affecting or modifying its silhouette, its external structure or the like. In some exemplary embodiments, a truck may comprise an open-box bed, to which the storage facility may be attached, either in a detachable or integral manner. The storage facility may be fully comprised by the open-box bed, and access thereto may be possible from the top of the open-box bed, from within the open-box bed, from a side wall of the open-box bed, or the like. It will be noted that the storage facility may be of smaller dimensions than that of the open-box bed, so as to allow the truck to use the remainder portion of the open-box bed compartment for storage not related to the storage facility. For example, the storage facility may have a volume of about 25% of the volume of the open-box bed compartment, reducing the capacity of the truck by about 25%, but still allowing the remaining about 75% of the volume to be used for the truck's primary objective.

Additionally or alternatively, the storage facility may be designed to be attached inside a cargo area of the vehicle, to replace a cargo area of the vehicle, to use the whole capacity of the vehicle, or the like.

In some exemplary embodiments, the storage facility may be selectively mountable on the vehicle. The storage facility may be removable from the vehicle. Additionally or alternatively, the storage facility may be mountable on a part of the vehicle, such as a driver cabin of the vehicle, a cargo area of the vehicle, a removable container carried by the vehicle, or the like. Additionally or alternatively, the storage facility may be integrated with the vehicle or part thereof.

In some exemplary embodiments, a landing pad for drones may be placed on a top of the storage facility. The landing pad may be utilized by drones depositing packages to the storage facility to ride thereon, to recharge, or the like. The drones may land on the landing pad placed on the top of the storage facility and take a ride with the vehicle carrying the storage facility.

A yet another technical solution is a storage facility integrated in a vehicle-transported container. In some exemplary embodiments, the storage facility may be positioned above the container. The height of the container along with the storage facility may be as a standard height of a standard vehicle-transported container. For example, the height of the container along with the storage facility may be 8 feet 6 inches (2.6 m) or 9 feet 6 inches (2.9 m). Additionally or alternatively, the dimensions of the container along with the storage facility may be the same as a conventional standard dimensions of a standard vehicle-transported container, which does not include a storage facility and generally comprises a single storage compartment used for a single objective.

One technical effect of utilizing the disclosed subject matter is expanding the range of delivery of the drone-based delivery system. Drones may have a limited flying range. By landing on vehicles, the drone may be able to reach larger distances and increase their effective range. The packages may be transferred on the vehicles to remote locations where a different drone may collect them and complete the delivery. In some exemplary embodiments, the disclosed subject matter may increase the effective range of the delivery of packages to overcome no-fly zones. The no-fly zones may comprise legal no-fly zones, where the drones are prohibited by a regulatory authority, such as the Federal Aviation Administration (FAA), laws, or the like. The no-fly zones may comprise effective no-fly zones, where the conditions do not effectively allow the drones to fly, such as weather conditions. The disclosed subject matter allows the drone-based delivery to pass through no-fly zones and delivery a package from an origin to a destination, even though the route in between passes through one or more no-fly zones.

Another technical effect of utilizing the disclosed subject matter is to enable utilization of resources currently unutilized or underutilized. As an example, personal drones can be used on parts of the delivery. Vehicles that are not related to the delivery may be utilized without affecting their designation.

As yet another technical effect of utilizing the disclosed subject matter is to improve utilization of drones in a delivery system. The disclosed subject matter may improve utilization of the drones themselves. In addition to improving the effective range of drone-based delivery, in a coordinated system, where a package is delivered by different drones in different legs, no drone resources are utilized for the delivery of the package while the package is being transported by a vehicle. As a result, the drones may be utilized at the same time for other tasks, thereby increasing the throughput of each drone comparison to a system where the drone is tasked with the entire delivery task of a package.

As yet another technical effect of utilizing the disclosed subject matter is establishing a business model for the integration between the drone delivery and the vehicle delivery. Companies owning the vehicles may rent roofs of the vehicles and enable delivery of many delivery companies. It will be noted that companies having fleets may view the rooftops of the vehicles as an under-utilized resource. Current potential utilization of such resource may be using it as a cheap advertising space in view of its limited visibility. The disclosed subject matter may enable monetization of the rooftops and increasing utilization of such resource, without adversely affecting the fleet.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Referring now to FIG. 1A showing a flowchart diagram of a method, in accordance with some exemplary embodiments of the subject matter.

On Step 110, an origin and a destination of a drone may be obtained. In some exemplary embodiments, the drone may be transporting a package from an origin to a destination. In some exemplary embodiments, additional data regarding the drone or the package may be obtained, such as the weight and the size of the parcel, deadline of the delivery, energy level of the drone, capacity of the drone (e.g., the weight the drone can carry, or the distance the drone can fly with the current energy level), or the like.

On Step 115, a schedule of a plurality of vehicles may be obtained. In some exemplary embodiments, the plurality of vehicles may be part of a fleet, private vehicles, public transportation vehicles, or the like. The schedule may comprise a schedule of each vehicle of the plurality of vehicles. In some exemplary embodiments, the vehicles may have known routes, with fairy known timing. Additionally or alternatively, the route and the timing of the vehicles may be predicted using GPS.

In some exemplary embodiments, some vehicles of the fleet may adapted for the drone to ride thereon. In some exemplary embodiments, the vehicles may not actively be participating in the delivery of the package. Rather, the vehicles may be used by the drone to ride thereon on portions of its route of delivering the package. In some exemplary embodiments, a landing pad may be placed on the top of each vehicle. The landing pad may be used by the drone to land on the top of vehicle. While landing on the top of the vehicle, the drone may shut down to save energy. Additionally or alternatively, the drone may recharge using energy of the vehicle, using solar energy, or the like. Additionally or alternatively, the drone may replace its battery with a fully charged battery available on the landing pad.

In some exemplary embodiments, some of the vehicles may be adapted to provide a ride for more than one drone. Such vehicle may have more than one landing pads on their top, may have landing pads adapted to host more than one drone, or the like. Additionally or alternatively, a single vehicle may be adapted to host different types of drones, such as drones of different designs, drones of different sizes, or the like.

On Step 120, a route may be determined for the drone. The route may be determined based on the delivery data and the schedule. The route may begin at the origin and may end at the destination.

In some exemplary embodiments, the route may comprise a plurality of legs. Each leg may be a portion of the route starting at a first waypoint and ending at a second waypoint. As an example, a route that is comprised of waypoints A, B, C, and D would contain three legs. The route legs would be from A to B, from B to C, and from C to D. A would be the origin of the route and D may be the destination of the route.

In a first portion of the plurality of legs the drone may be planned to fly. In a second portion of the plurality of legs the drone may be planned to ride on a vehicle. Referring to the previous example, the drone may be planned to fly from the origin (e.g., waypoint A) to waypoint B. The drone may be planned to ride on a vehicle at waypoint B to waypoint C. Then the drone may be planned to fly from waypoint C to the destination (e.g., waypoint D).

In some exemplary embodiments, the route may comprise a first leg, a second leg and a third leg. The first leg may immediately precede the second leg and the second leg may immediately precede the third leg. In the first leg, the drone may be planned to be transported by a first vehicle. In the second leg, the drone may be planned to fly from the first vehicle to a second vehicle. In the third leg, the drone may be planned to be transported by the second vehicle. Additionally or alternatively, in the second leg, the drone may be planned to make a stop at a stationary location after flying off from the first vehicle and before flying on to the second vehicle. The drone may make the stop to recharge, collect another package, or the like.

In some exemplary embodiments, the route may be determined based on additional limitations, such as an initial energy level of a power source of the drone, expected power consumption of the drone at each leg, based on expected charging of the power source at each leg, or the like. The route may be planned so as to be feasible for the drone in view of energy available to the drone. As an example, in case the power in the drone is not sufficient to fly in the leg from A to B, the leg may be divided into sub-legs, A to E, E to F, and F to D. The drone may be planned to fly from A to E, land on a second vehicle from E to F, while saving energy or re-charging; and then fly from E to B where the drone can catch the vehicle and ride thereon.

In some exemplary embodiments, the route may be provided to the drone. The drone may deliver the package while performing the plurality of legs.

Figure 1B:
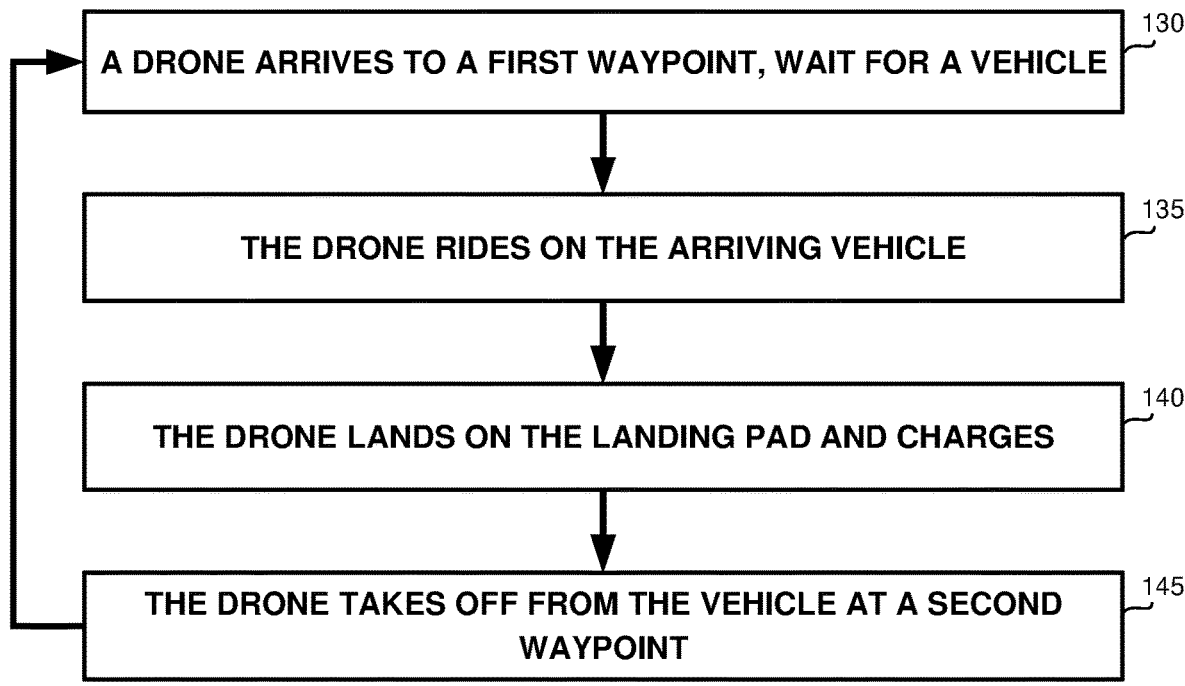

Referring now to FIG. 1B showing a flowchart diagram of a method, in accordance with some exemplary embodiments of the subject matter.

On Step 130, a drone may arrive to a first way point and wait for a vehicle to arrive. In some exemplary embodiments, the drone may be carrying a package to be delivered from an origin to a destination.

In some exemplary embodiments, the drone may have flew from a previous way point to first way point. The previous way point may be the origin of the package, a way point where the drone were landing on a land station on a vehicle, a charging point, or the like.

In some exemplary embodiments, the drone may be flying in accordance with a predetermined route, such as the route determined on Step 120.

On Step 135, the drone may ride on the arriving vehicle. In some exemplary embodiments, the drone may be configured to identify the arriving vehicle, such as by identifying homing beacons, based on the timing the arriving vehicles arrives to the first way point, or the like. As an example, the drone may be configured to ride on the vehicle that arrives to the first waypoint at a predetermined timing. Additionally or alternatively, the drone may be configured to identify the arriving vehicle using a camera, a sensor, or the like. The drone and the vehicle may be configured to connect, and therefore identify the vehicle has arrived, by applying a wireless handshaking, pairing, or the like. Additionally or alternatively, communication between the drone and the vehicle may be implemented directly or through a third party, such as through the cloud, where the drone communicates (either directly or indirectly) with a server connectable via the Internet and the server communicates with the vehicle (either directly or indirectly) via the Internet, and vice versa. Additionally or alternatively, the location of the vehicle may be provided using a GPS-based system tracking the vehicle's location and notifying the drone upon the arrival of the vehicle to the target waypoint. At such time, the drone may be configured to identify the vehicle from a plurality of vehicles that are located at the proximate location indicated by the GPS-based system. In some exemplary embodiments, the GPS-based system may utilize any location modules in addition to or instead of GPS.

On Step 140, the drone may land on a landing pad of the vehicle and re-charge its battery. In some exemplary embodiments, the landing pad may be located on the top of the arriving vehicle. The landing pad may be conformed to the drone to land thereon. The drone may be turned off during landing on the landing pad to save energy. In some exemplary embodiments, the landing pad may be equipped with a charger that the drone can connect to and recharge. The charger may supply energy to the drone form a running engine of the vehicle, an alternator of the vehicle, a rechargeable battery placed on the landing pad, or the like. Additionally or alternatively, the drone may be solar powered and may recharge using solar panels placed on the top of the vehicle.

It may be appreciated that the vehicle may not be actively participating in a delivery system of the package. The vehicle may be performing another task that is independent from the delivery of the package.

On Step 145, the drone may get off the vehicle at a second way point. In some exemplary embodiments, the vehicle may continue driving without being affected by the drone riding or leaving it. The drone may wait for additional vehicle to arrive and land thereon. Additionally or alternatively, the drone may fly to a third waypoint and wait there for the additional vehicle to arrive.

In some exemplary embodiments, due to dynamic considerations, the drone may deviate from the originally planned route. As an example, if the vehicle stumbles heavy traffic, which was not expected, the drone may change its route. In some exemplary embodiments, the drone may request a central server for a modified route in real-time, or may plan the modified route itself. In some exemplary embodiments, the drone may take off from the jammed vehicle and fly to a different vehicle, to a next waypoint, or the like, so as to avoid being adversely affected by the heavy traffic.

Figure 1C:
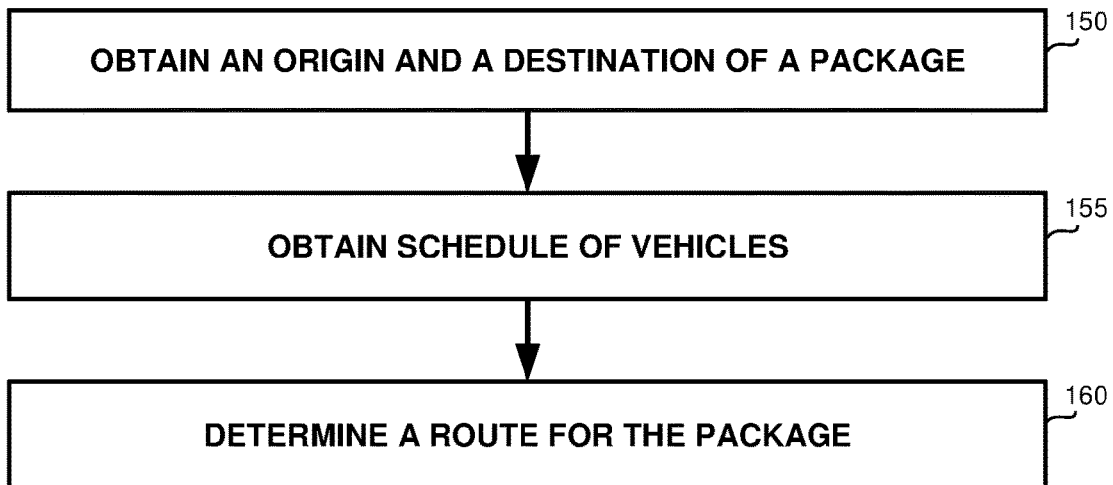

Referring now to FIG. 1C showing a flowchart diagram of a method, in accordance with some exemplary embodiments of the subject matter.

On Step 150, an origin and a destination of a package may be obtained. In some exemplary embodiments, the package may be planned to be delivered from the origin to the destination. The package may contain food, goods, medicines, lightweight commercial products, letters, or the like. In some exemplary embodiments, the package may be of limited weight that the drone can carry, such as up to 10 pounds, 15 pounds, 20 pounds, or the like. Additionally or alternatively, the package may be of limited size, such as up to $50 \times 30 \times 20$ cm$^3$, $40 \times 40 \times 40$ cm$^3$, or the like; of a predefined shape, such as a flat box, or the like; such as to be adapted to be transported by a drone. It will be noted that the package delivered by the drone may be a container of a predefined shape and size may be utilized to store one more delivered items of varying sizes, while being carried by the drone. The package may be adapted in size and shape to be carried by the drone, such as a plastic or cardboard box that can fit. As an example, AMAZON™ may use a standard size container for all its products that are to be delivered by drones, and that can carry up to about five pounds of products. Such a container may be sufficient to contain a large portion of the products sold by AMAZON™, such as about 40%, about 60%, about 80% or the like.

In some exemplary embodiments, the package may be planned to be loaded to a drone at the origin, and taken from the drone or a different drone at the destination. The package may be loaded and unloaded to and from the drones by a human. Additionally or alternatively, each drone may be planned to automatically carry the package on the origin and release it at the destination.

In some exemplary embodiments, additional data regarding the package may be obtained, such as weight and size of the package, fragility of objects within the package, deadline of the delivery, storing temperature of items within the package, or the like.

On Step 155, a schedule of vehicles may be obtained, similarly to Step 115. The vehicles may not be actively participating in the delivery of the package. The vehicles may be capable of transporting a drone thereon. Additionally or alternatively, the vehicles may be capable of transporting the package.

On Step 160, a route may be determined for the delivery of the package. The route may be determined based on the delivery data and the schedule. The route may begin at the origin and end at the destination.

In some exemplary embodiments, the route may comprise a plurality of legs. Each leg may be a portion of the route starting at a first waypoint and ending at a second waypoint.

In each leg of a first portion of the plurality of legs the package may be planned to be transported by a different drone. In each leg of a second portion of the plurality of legs the package may be planned to be transported by a different vehicle.

In some exemplary embodiments, the plurality of legs may comprise a first leg, a second leg and a third leg. In the first leg the package may be planned to be transported by a first drone to a vehicle. In the second leg the package may be planned to be transported by the vehicle. In the third leg the package may be planned to be transported from the vehicle by a second drone. In some exemplary embodiments, the first drone and the second drone may be different drones, each of which is local to a different area. The different drones may be adapted in capabilities for different areas. As an example, the first drone structure may be adapted to fly in a windy and rainy area, such as by having a stronger structure, larger wings, or the like, and accordingly may consume more energy and fly for limited distances. The second drone may be adapted to fly in open area, with regular weather, and accordingly may be planned to fly for longer distances. In some exemplary embodiments, a central planning may be required for co-operation between the different drones and the different vehicles.

Figure 1D:
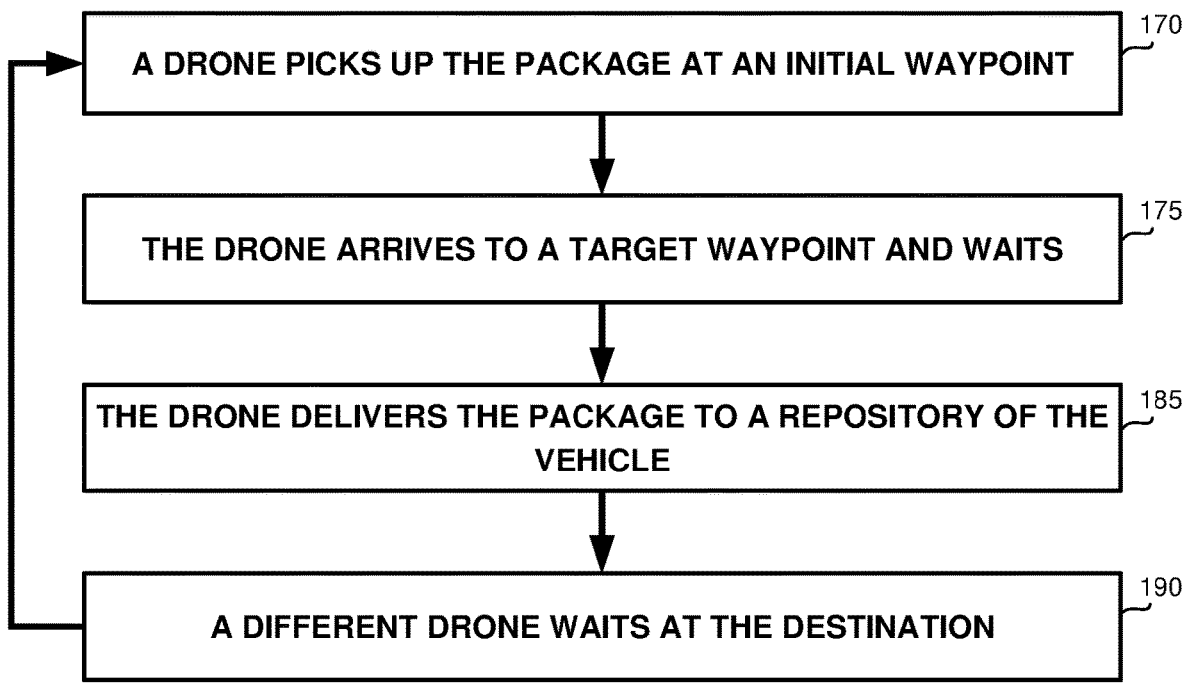

Referring now to FIG. 1D showing a flowchart diagram of a method, in accordance with some exemplary embodiments of the subject matter.

On Step 170, a drone may pick up a package. In some exemplary embodiments, the package may be in a delivery process from an origin to a destination. The package may be transported based on a delivery route such as the route determined on Step 160.

In some exemplary embodiments, the route may comprises a plurality of legs. In each leg of a first portion of the plurality of legs, the package may be planned to be transported by a different drone from an initial waypoint to a target waypoint. In each leg of a second portion of the plurality of legs the package may be planned to be transported by a different vehicle. The drone may be configured to pick up the package at a first initial way point.

On Step 175, the drone may arrive at a target waypoint. In case the vehicle has not yet arrived, the drone may wait at the target waypoint the vehicle. In some exemplary embodiments, the drone may fly with the package until reaching the target waypoint. In some exemplary embodiments, the drone may wait at the target waypoint until the vehicle arrives to the target waypoint. The drone may be configured to identify the arriving vehicle such as described in Step 135 of FIG. 1B.

On Step 185, the drone may deliver the package to a repository of the vehicle. In some exemplary embodiments, the drone may fly and leave the package in the vehicle.

The package may be transported by the vehicle to a second waypoint.

In some exemplary embodiments, an opening of the repository may be located on the top of the arriving vehicle, so that the drone may be able to deposit the package thereto. The opening that is adapted in size and shape to allow depositing and collecting of a package by a drone. In some exemplary embodiments, the repository may be adapted for the drone to connect thereto for depositing the package thereon. Additionally or alternatively, the drone may be configured to drop the package on the top of the repository without landing thereon.

It may be appreciated that the vehicle may not be actively participating in a delivery system of the package. The vehicle may be performing another task that is independent from the delivery of the package.

On Step 190, a second drone may wait at the second waypoint to pick up the package. In some exemplary embodiments, the second drone may pick up the package at the second way point as described in Step 170. The repository may be adapted for the second drones to connect thereto for collecting the package therefrom. In some exemplary embodiments, the second drone may be different than the first drone.

Figure 2A:
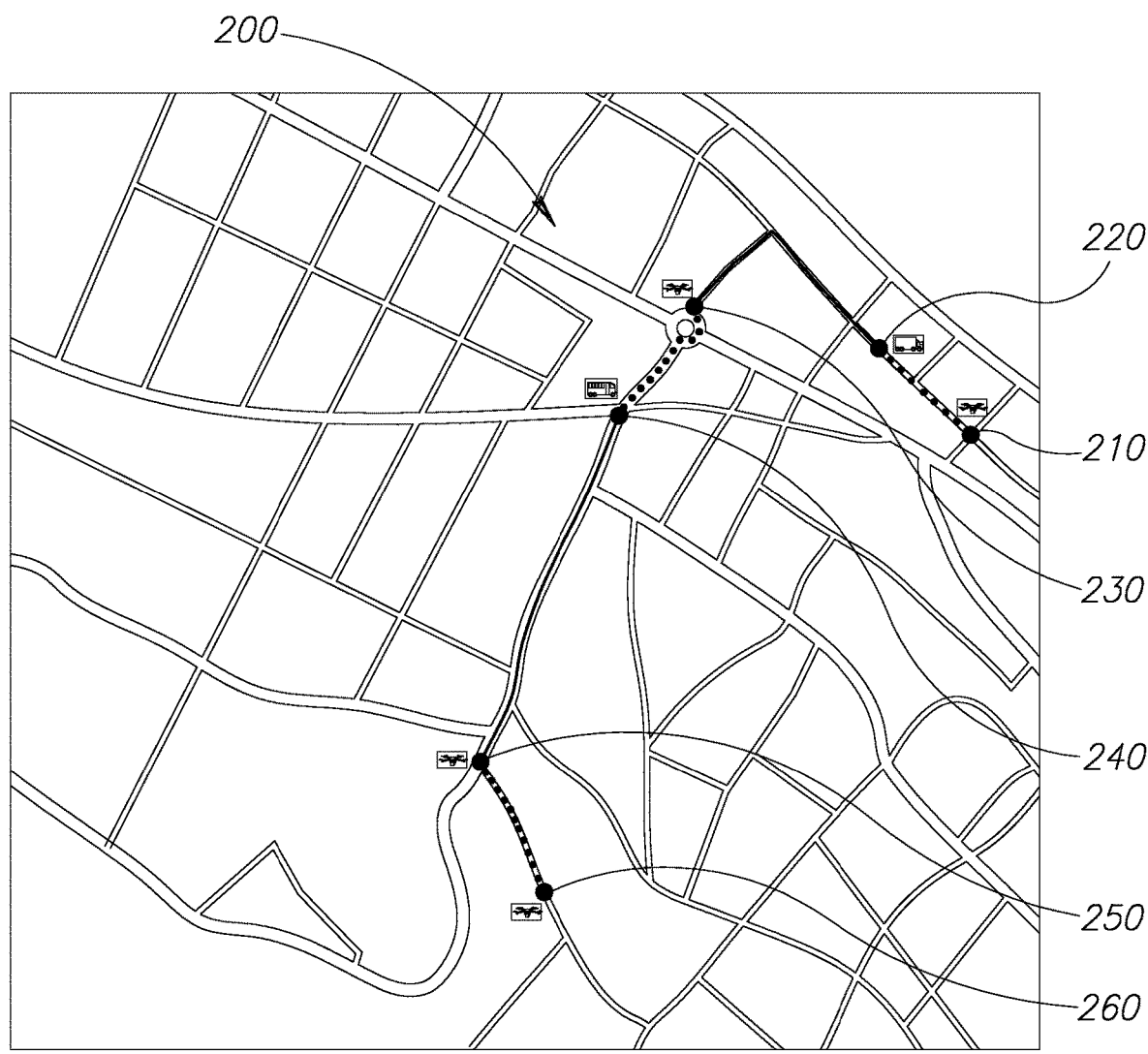
FIGS. 2A-2B show schematic illustrations of a map and a route schedule, in accordance with some exemplary embodiments of the disclosed subject matter.

Referring now to FIG. 2A showing schematic illustrations of a map, in accordance with some exemplary embodiments of the disclosed subject matter.

A Route 200 may be a route for delivering a package from an origin to a destination using a drone. Route 200 may be determined based on a delivery data of the package and a schedule of a plurality of vehicles, such as buses, trucks, trains, or the like. In some exemplary embodiments, the schedule may comprise a schedule of each vehicle of the plurality of vehicles. Each vehicle of the plurality of vehicles may be capable of transporting the drone thereon.

In some exemplary embodiments, vehicles of the plurality of vehicles may not be actively participating in a delivery of the package. Each vehicle of the plurality of vehicles may performing another task that is independent from the delivery of the package. As an example, one vehicle may be a bus transporting passengers within a city or between cities. As another example, another vehicle may be a delivery truck used for long distance distribution of goods.

In some exemplary embodiments, Route 200 may begin at the origin located at Waypoint 210, and end at the destination located at Waypoint 260. Route 200 may comprise a plurality of legs. Each leg may begin at a first waypoint and end at a second waypoint, where the successive leg may begin. As an example, a first leg of Route 200 may begin at Waypoint 210 and end at Waypoint 220. A second leg of Rout 200 may begin at Waypoint 220 and end at Waypoint 230.

In a first portion of the plurality of legs the drone may be planned to fly. In each leg of the first portion of the plurality of legs, the drone may be planned to fly from an initial waypoint to a target waypoint. As an example, the drone may be planned to fly in the first leg from Waypoint 210 to Waypoint 220, in the third leg from Waypoint 230 to Waypoint 240, and in the fifth leg from Waypoint 250 to Waypoint 260.

In each leg of a second portion of the plurality of legs the drone may planned to ride on a different vehicle. As an example, the drone may be planned to ride on a truck in the second leg, from Waypoint 220 to Waypoint 230 and in the fourth leg, the drone may be planned to ride on a bus from Waypoint 240 to Waypoint 250.

In some exemplary embodiments, the drone may be planned to make a stop at a stationary location after flying off from the first vehicle and before flying on to the second vehicle. As an example, after flying from the truck at Waypoint 230, the drone may make a stop at Location 235, such as for re-charging, for time coordination between the two vehicles, or the like. The drone may be planned to fly again from Location 235 to Waypoint 240 located on the bus. The drone may be planned to fly again after a predetermined timeframe, such as an hour, 30 minutes, 20 minutes, or the like.

In some exemplary embodiments, the drone may be planned to utilize at least a portion of the vehicles for charging a power source of the drone. As an example, charging stations may be located on the vehicles. The drone may be planned to recharge the power source thereof using the charging stations.

As energy and power may be a limiting factor on drones operating distance and duration, Route 200 may be further determined based on the energy element of the drone. Route 200 may be planned so as to be feasible for the drone in view of energy available to the drone. In some exemplary embodiments, Route 200 may be further determined based on an initial energy level of a power source of the drone. A maximal length and a duration of legs in Route 200 may be determined on the initial energy level and the distance the drone can fly with such level. Additionally or alternatively, Route 200 may be further determined based on expected power consumption of the drone at each leg. As an example, during legs that the drone is configured to ride on a vehicle, the drone may be shut down, or recharged, accordingly, there may be no limitation on such legs. As opposed to legs that the drone is planned to fly, the duration and distance of such legs may be determined based on the expected power consumption of the drone in these legs. Different elements may affect the expected power consumption of the drone of each leg, such as the weight of the package, expected air resistance in the area the drone is planned to fly in, expected whether, or the like. Additionally or alternatively, Route 200 may be further determined based on expected charging of the power source at each leg. As an example, the duration of a leg of the first portion may be determined based on the expected charging of the power source at the preceding leg where the drone is landing on a vehicle and charging thereon.

Additionally or alternatively, Route 200 may be further determined based on characteristics of the drone, such as the size and weight of the drone, the drone power consumption rate, the maximal height the drone can fly, the degree of autonomy of the drone, or the like. These characteristics may be important, for example for the drone's cruising range, the maximum flight duration, or the like. Additionally or alternatively, Route 200 may be further determined based on characteristics of the package, such as the type of payloads (e.g., mail parcels, medicines, fire extinguishing material, flyers, or the like), as the size and weight of the package, or the like. Additionally or alternatively, Route 200 may be further determined based on financial consideration, such as the cost of utilizing a vehicle in a specific leg. As an example, some vehicles may ask for a compensation for the ride thereon, for charging costs, or the like. Additionally or alternatively, Route 200 may be further determined based on traffic conditions during the planned schedule. In location where heavy traffic is predicted during a specific leg of Route 200 that the drone is planned to ride on a vehicle, the drone may be planned to take off the vehicle to pass the heavy traffic area.

In some exemplary embodiments, the drone landing on a vehicle may change the height thereof. In some portions of the route, limitations on the height of the vehicles may apply such as because of driving under bridges of limited heights, driving into tunnels of limited heights, or the like. Route 200 may be planned such that the total height of the vehicle with the drone landing thereon may not exceed the height limitations in such portions. Additionally or alternatively, the drone may be planned to take off when arriving to a location with a height limitation and land back on the vehicle after the height limitation is over.

In some exemplary embodiments, Route 200 may be provided to the drone. The drone may deliver the package while performing the plurality of legs. Route 200 may be provided to an operator of the drone, to an operation system of the drone, to the delivery system operator, or the like. The drone may be repeatedly flown in accordance with the first portion of the plurality of legs. In each leg of the first portion of the plurality of legs, the drone may be flown from a first landing location to a second landing location. The first landing location may be located at the initial waypoint of the each leg. The second landing location may be located at the target waypoint of the each leg. In some exemplary embodiments, at least one landing location may associated with a vehicle. As an example, a landing location locate at Waypoint 240 may be associated the bus. The drone may be transported by the bus in accordance with a leg of the second portion of the plurality of legs, e.g. the fourth leg of Route 200.

Figure 2B:
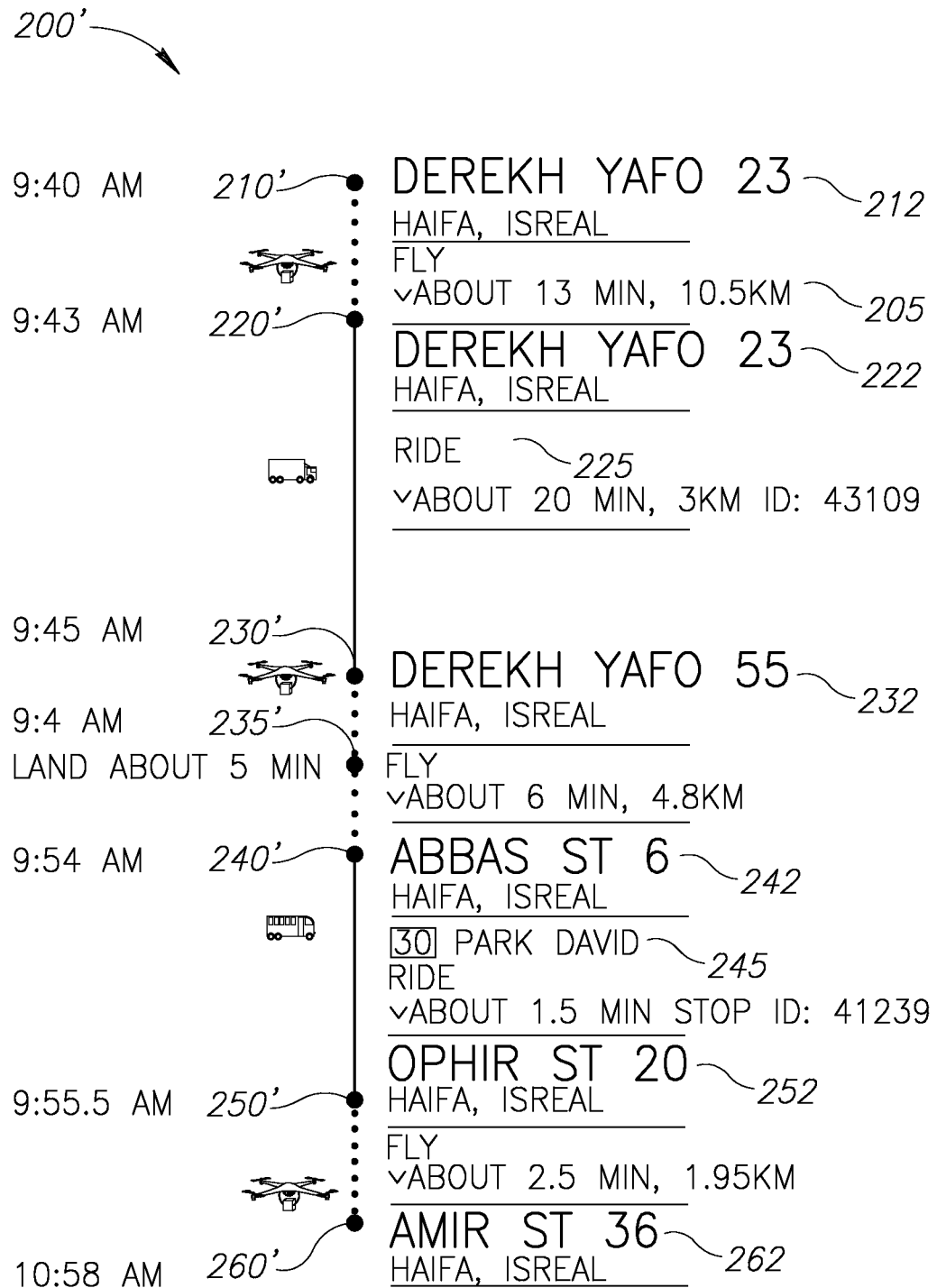

Referring now to FIG. 2B showing schematic illustrations of route schedule, in accordance with some exemplary embodiments of the disclosed subject matter.

In some exemplary embodiments, Route 200' may be respective to Route 200 presented in FIG. 2A. Route 200' may represent in addition to the delivery route represented by Route 200, a delivery schedule of Route 200.

In some exemplary embodiments, Route 200' may begin at Waypoint 210' which is respective to the origin located at Waypoint 210 in FIG. 2A. Route 200' may be planned to begin at 9:40 AM. Route 200' may end at Waypoint 260' which is respective to the destination located at Waypoint 260 in FIG. 2A. Route 200' may be planned to begin at 10:45 AM. Route 200' may comprise a plurality of legs. Each leg may begin at a first waypoint and end at a second waypoint, where the successive leg may begin. As an example, a first leg of Route 200' may begin at Waypoint 210' and end at Waypoint 220'. A second leg of Rout 200' may begin at Waypoint 220' and end at Waypoint 230'.

In accordance with Route 200, in a first portion of the plurality of legs the drone may be planned to fly. In each leg of a second portion of the plurality of legs the drone may planned to ride on a different vehicle.

Namely, in the first leg of Route 200', Drone 205 may be planned to fly from Waypoint 210' located at Address 212, for about 13 minutes, a distance of 10.14 km. On Waypoint 220' located at Address 222, Drone 205 may be planned to ride on a Vehicle 225 for 20 minutes and get off Vehicle 225 on Waypoint 230' located at Address 232. Drone 205 may be planned to fly from Waypoint 230', for about 4 minutes, a distance of 3.1 km, until reaching Location 235'. Drone 205 may be planned to land on Location 235' that is respective to Location 235 for about 5 minutes. Drone 205 may fly for about 6 minutes a distance of 4.8 km, until reaching Waypoint 240'. On Waypoint 240' located at Address 242, Drone 205 may be planned to ride on Vehicle 245 for 15 minutes. Vehicle 245 may be a bus. Drone 205 may be planned to get off the bus at stop number 41239, e.g. Waypoint 250' located at Address 252. Drone 205 may be planned to fly from Waypoint 250', for about 2.5 minutes, a distance of 1.95 km, until reaching the destination at Waypoint 260'.

Figure 3A:
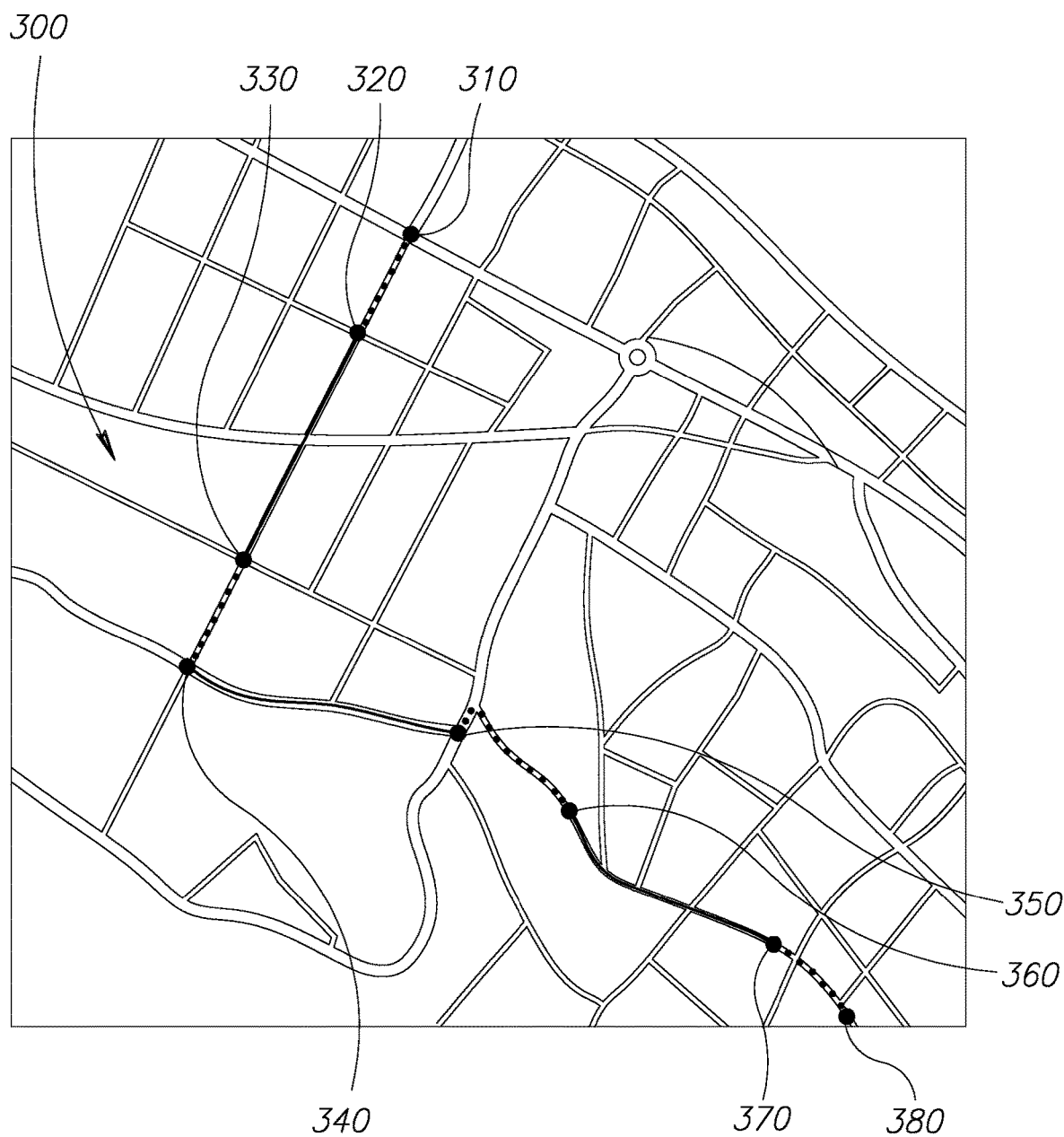
FIGS. 3A-3B show schematic illustrations of a map and a route schedule, in accordance with some exemplary embodiments of the disclosed subject matter.

Referring now to FIG. 3A showing schematic illustrations of a map, in accordance with some exemplary embodiments of the disclosed subject matter.

A Route 300 may be a route for delivering a package from an origin to a destination. Route 300 may be determined based on a delivery data of the package and a schedule of a plurality of vehicles, such as buses, trucks, trains, or the like. In some exemplary embodiments, the schedule may comprise a schedule of each vehicle of the plurality of vehicles. Each vehicle of the plurality of vehicles may be capable of transporting a package that is deposited and collected autonomously by one or more autonomous drones without intervention of the vehicle or person riding thereon.

In some exemplary embodiments, vehicles of the plurality of vehicles may not be actively participating in a delivery of the package. Each vehicle of the plurality of vehicles may performing another task that is independent from the delivery of the package. As an example, one vehicle may be a train wagon transporting passengers within between cities, another vehicle may be a vehicle-transported container used for storing and transporting goods, or the like.

In some exemplary embodiments, Route 300 may begin at an origin located at Waypoint 310, and end at a destination located at Waypoint 390. Route 300 may comprise a plurality of legs. Each leg may begin at a first waypoint and end at a second waypoint, where the successive leg may begin. As an example, a first leg of Route 300 may begin at Waypoint 310 and end at Waypoint 320. A second leg of Route 300 may begin at Waypoint 320 and end at Waypoint 330.

In some exemplary embodiments, in each leg of a first portion of the plurality of legs the package may be planned to be transported by a different drone. Namely, the package may be planned to be transported by a first drone in the first leg, from Waypoint 310 to Waypoint 320. In the third leg, the package may be planned to be transported by a second drone from Waypoint 330 to Waypoint 340. In the fifth leg, the package may be planned to be transported by a third drone from Waypoint 350 to Waypoint 360. In the seventh leg, the package may be planned to be transported by a fourth drone from Waypoint 380 to Waypoint 390.

In each leg of a second portion of the plurality of legs the package may planned to be transported on a different vehicle. Namely, in the second leg, the package may be planned to be transported on a first truck from Waypoint 320 to Waypoint 330. In the Fourth leg, the package may be planned to be transported on a first bus from Waypoint 340 to Waypoint 350. In the Fourth leg, the package may be planned to be transported on a second bus from Waypoint 370 to Waypoint 380.

Figure 3B:
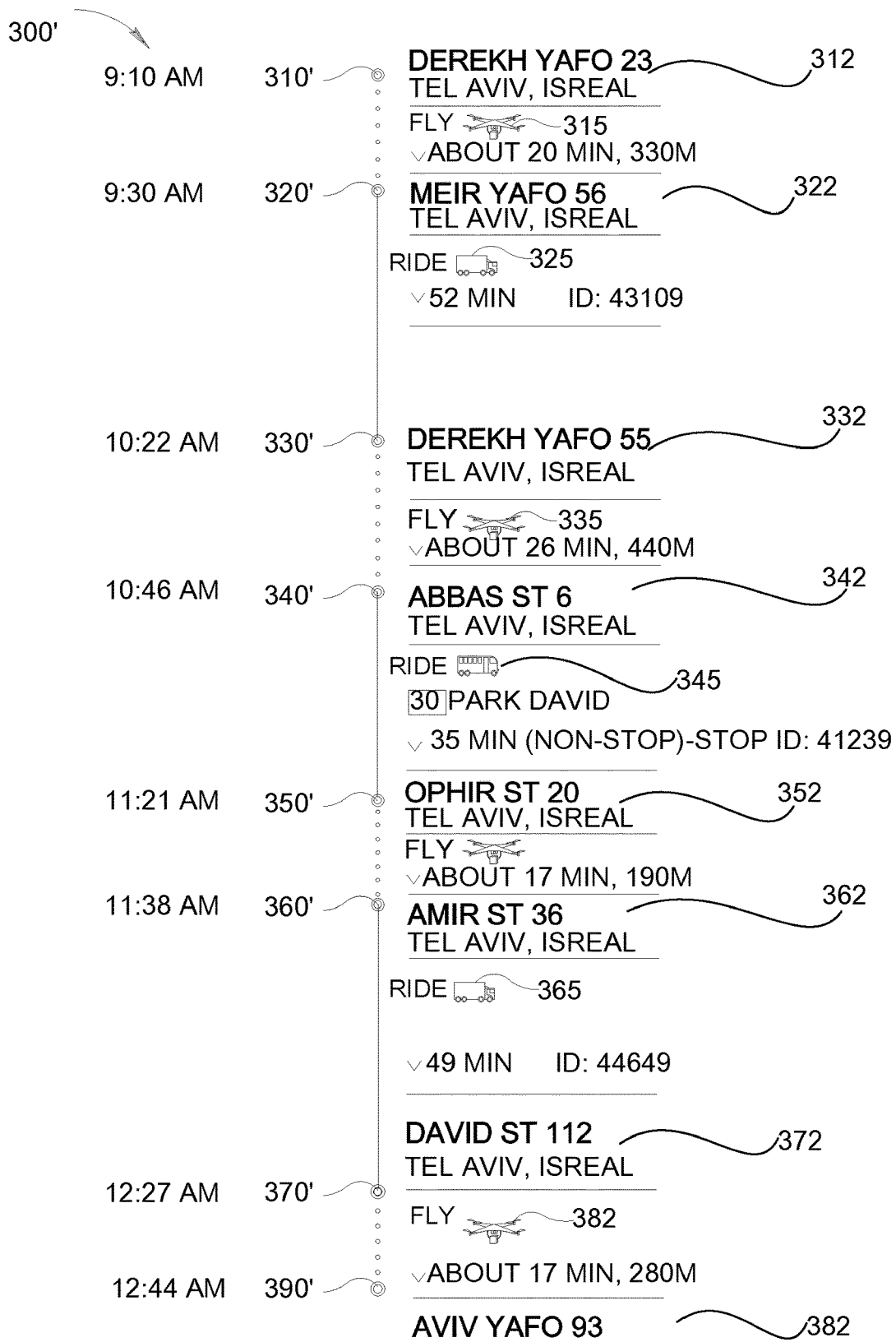

Referring now to FIG. 3B showing schematic illustrations of a route schedule, in accordance with some exemplary embodiments of the disclosed subject matter.

In some exemplary embodiments, Route 300' may be respective to Route 300 presented in FIG. 3A.

In some exemplary embodiments, Route 300' may begin at Waypoint 310' which is respective to the origin located at Waypoint 310 in FIG. 3A. Route 300' may end at Waypoint 380' which is respective to the destination located at Waypoint 380 in FIG. 3A. Route 300' may comprise a plurality of legs. Each leg may begin at a first waypoint and end at a second waypoint, where the successive leg may begin. As an example, a first leg of Route 300' may begin at Waypoint 310' and end at Waypoint 320'. A second leg of Rout 300' may begin at Waypoint 320' and end at Waypoint 330'.

In accordance with Route 300, in each leg of a first portion of the plurality of legs the package may be planned to be transported by a different drone. In each leg of a second portion of the plurality of legs the package may planned to be transported on a different vehicle.

Namely, in the first leg of Route 300', a First Drone 315 may be planned to transport the package from Waypoint 310' located at Address 312. First Drone 315 may be planned to fly for about 3 minutes, a distance of 330 meters, until reaching Waypoint 320' located at Address 322. On Waypoint 320', First Drone 315 may be planned to deposit the package on Vehicle 325. Vehicle 325 may be a truck that is not actively participating in the delivery of the package. The package may be planned to be located on the top of Vehicle 325 for 14 minutes, from Waypoint 320' to Waypoint 330'. On Waypoint 330' located at Location 332, a Second Drone 335 may be planned to collect the package from Vehicle 325. Second Drone 335 may be planned to transport the package from Waypoint 330' to Waypoint 340'. On Waypoint 340', Second Drone 335 may be planned to deposit the package on Vehicle 345. Vehicle 345 may be a bus that is not actively participating in the delivery of the package. The package may be planned to be located on the top of Vehicle 335 for 15 minutes, from Waypoint 340' to Waypoint 350'. On Waypoint 350' located at Location 352, a Third Drone 355 may be planned to collect the package from Vehicle 345. Third Drone 355 may be planned to transport the package from Waypoint 350' to Waypoint 360'. On Waypoint 360', Third Drone 355 may be planned to deposit the package on Vehicle 365. Vehicle 365 may be a truck that is not actively participating in the delivery of the package. The package may be planned to be located on the top of Vehicle 365 for 20 minutes, from Waypoint 360' to Waypoint 370'. On Waypoint 370' located at Location 372, a Fourth Drone 375 may be planned to collect the package from Vehicle 365. Fourth Drone 375 may be planned to transport the package from Waypoint 370' to Waypoint 380' and deliver the package at the destination.

In some exemplary embodiments, each different drone may be local to a different area. The different drones may be adapted in capabilities for the different areas. As an example, First Drone 315 may be a drone that is configured to fly in a mountainous are for a potential significant height, such as an S1000+™ drone, DJI S900 Spreading Wings Hexacopter, or the like. First Drone 315 may be adapted in capabilities for the area between Location 312 and Location 322. First Drone 315 may be configured to have a stable flight and strong construction in order to be able to fly over mountains. On the other hand, Second Drone 335 may be a drone with an extended flight time, such as Phantom 4. Second Drone may be adapted to fly for larger distances in areas with no landing locations available.

In some exemplary embodiments, in some legs of the second portion, a drone may ride on a vehicle with the package. As an example, In short legs, instead of depositing the package on a vehicle and planning a different drone to collect the package, the same drone may be planned to ride on the vehicle with the package and transport it to the next waypoint. As an example, in an alternative scenario to that shown in FIG. 3B, First Drone 315 may be planned to reach Waypoint 320' and ride from Waypoint 320' on Vehicle 325 along with the package, instead of depositing the package on Vehicle 325. On Waypoint 330', First Drone 315 may be planned to takeoff and fly with the package from Vehicle 325 to Waypoint 340', instead of Second Drone 335 collecting the package as is shown in FIG. 3B. On Waypoint 340', First Drone 315 may be planned to deposit the package on Vehicle 345, similarly to the planned operation of Second Drone 335 in FIG. 3B.

Figure 4:
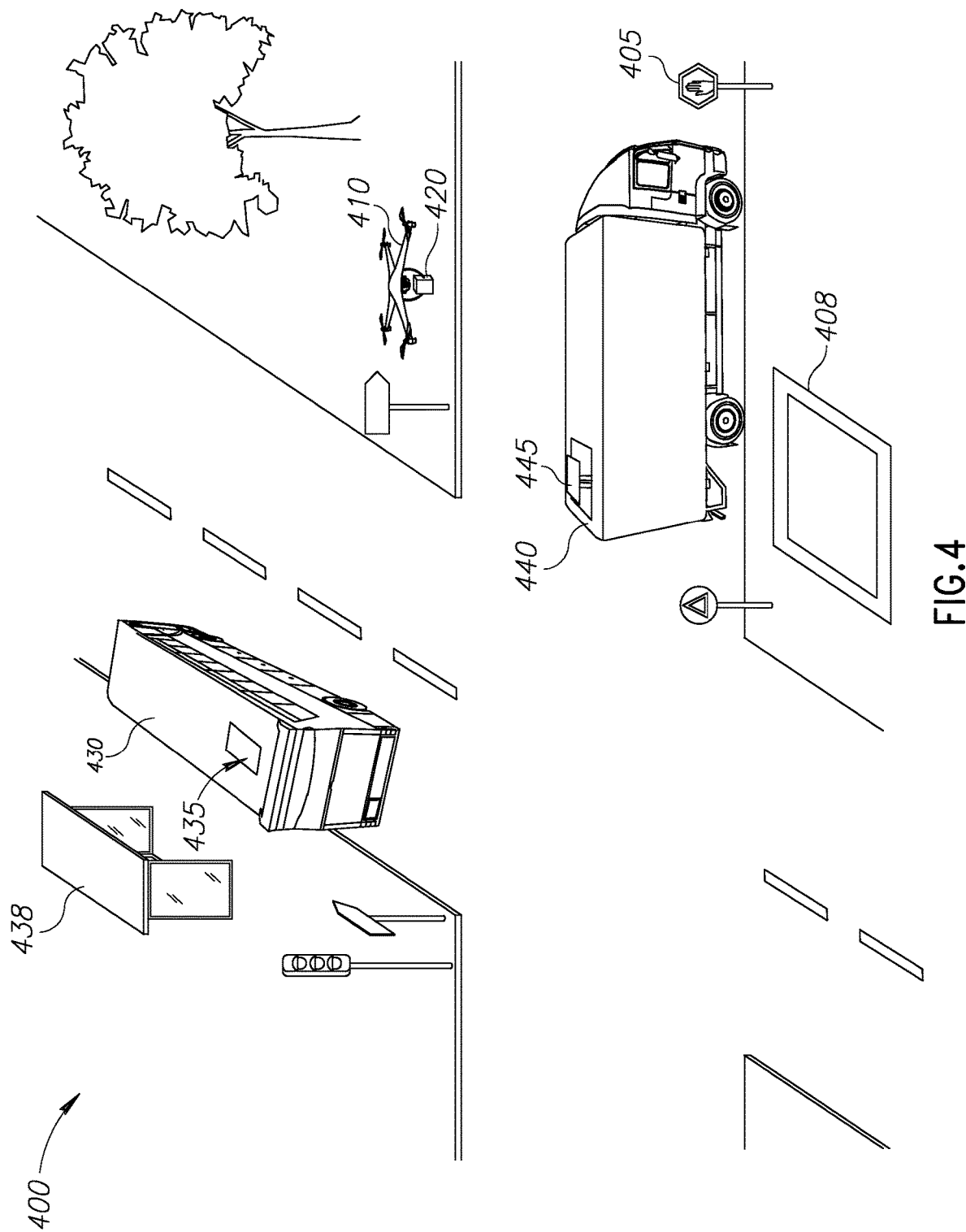
FIG. 4 shows a schematic illustration of an exemplary environment in which the disclosed subject matter may be utilized, in accordance with some exemplary embodiments of the disclosed subject matter.

Referring now to FIG. 4 showing a schematic illustration of an exemplary environment in which the disclosed subject matter may be utilized, in accordance with some exemplary embodiments of the disclosed subject matter.

In some exemplary embodiments, a Package 420 may be transported by a Drone 410 from an origin to a destination. Drone 410 may be an unmanned aerial vehicle utilized to transport packages, food or other goods.

In some exemplary embodiments, Drone 410 may be operated by a ground-based controller (not shown). Drone 410 and the ground-based controller and may be components of an unmanned aircraft system that comprises a system of communications between Drone 410 and the ground-based controller. The flight of Drone 410 may operate with various degrees of autonomy: either under remote control by a human operator or autonomously by onboard computers.

In some exemplary embodiments, Drone 410 may be configured to transport Package 420 in accordance with a predetermined route. The predetermined route may be determined based on a delivery data of Package 420 and a schedule of plurality of vehicles. The delivery data may comprise the origin and the destination of Package 420, the weight and size of Package 420, or any other information related to the delivery of Package 420. The schedule comprises a schedule of each vehicle of the plurality of vehicles.

In some exemplary embodiments, the plurality of vehicles may be vehicles that are capable of transporting Drone 410 thereon, such as a Vehicle 440 and a Vehicle 430. A landing pad adapted for Drone 410 to land thereon may be placed on the top of each vehicle, such as a Landing pad 435 that may be mounted on the top of Vehicle 430 and a Landing pad 445 that may be mounted on the top of Vehicle 440.

In some exemplary embodiments, Vehicle 440 and Vehicle 430 may not actively be participating in a delivery of Package 420. Vehicle 440 and Vehicle 430 may be performing another task that is independent from the delivery of Package 420, such as delivery task of other goods, transporting passengers, or the like. As an example, Vehicle 430 may be a bus transporting passengers and deigned to stop in predetermined bus stations based on passengers demand, and according to a predetermined schedule. As another example, Vehicle 440 may be a truck used to transport cooled products. The truck may be configured to travel based on a predetermined schedule, and stop according to road signs or traffic lights. Transporting Drone 410 by Vehicle 440 and Vehicle 430 may not affect the travel of Vehicle 440 and Vehicle 430. In some exemplary embodiments, Drone 410 may be configured to utilize Vehicle 440 and/or Vehicle 430 for charging a power source of Drone 410.

In some exemplary embodiments, the predetermined route may begin at the origin of Package 420 and end at the destination of Package 420. The predetermined route may comprise a plurality of legs. Drone 410 may be configured to deliver Package 420 while performing the plurality of legs. In a first portion of the plurality of legs Drone 410 may be planned to fly and in each leg of a second portion of the plurality of legs Drone 410 may be planned to ride on a different vehicle.

In some exemplary embodiments, Drone 410 may fly from a first location while carrying Package 420 to Vehicle 430, in accordance with a first leg of the predetermined route. When reaching Vehicle 430, Drone 410 may land on Landing pad 435 and ride thereon, while Vehicle 430 driving from a second location to a third location, in accordance with a second leg of the predetermined route. When reaching the third location, Drone 410 may get of Vehicle 430 and fly towards Vehicle 440 in accordance with a third leg of the route. When reaching Vehicle 440 at a fourth location, Drone 410 may land on Landing pad 445 and ride thereon, while Vehicle 440 driving from the fourth location to a fifth location, in accordance with a fourth leg of the predetermined route.

In some exemplary embodiments, Drone 410 may make a stop at a stationary location such as Landing Pad 450. Landing Pad 450 may be a static landing pad adapted for Drone 410 to land on. Drone 410 may make the stop at Landing Pad 450, after flying off from the Vehicle 430 and before flying on to Vehicle 440. Drone 410 may make the stop to recharge, to wait for Vehicle 440, or the like. As an example, Drone 410 may be planned to get off at Bus Station 438 to fly to another location where Drone 410 can ride on Vehicle 440. In some cases, Vehicle 430 may not stop at Bus Station 438, such as if no passengers are waiting in Bus Station 438, or if no passengers are getting off Vehicle 430 in Bus Station 438. In such a case, Drone 410 may get off Vehicle 430 at its next stop, such as at the next bust station, next stop sign, or the like. Drone 410 may fly to the planned location for riding on Vehicle 430. On the other hand, Vehicle 440 may not stop at the planned location, such as in case the driver thereof does not obey to road signs. For such a case, a flexible schedule may be determined for Drone 410, where Drone 410 can land in Landing Pad 450 to wait for Vehicle 440 if necessary.

Additionally or alternatively, Package 420 may be delivered by multiple drones in addition to Drone 410. The multiple drones may be configured to collect packages from the land, put packages on vehicles, move packages from one vehicle to another, riding vehicles with the package, making deliveries of packages, or the like. Drone 410 and the additional drones may be different drones. Each of drone may be local to a different area. Each drone may be adapted in capabilities for the different areas. Vehicle 430 and Vehicle 440 may be capable of transporting Package 420. Package 420 may be deposited and collected autonomously by one or more autonomous drones without intervention of the vehicle or person riding thereon.

In some exemplary embodiments, an additional drone (not shown) may fly from a first location while carrying Package 420 to Vehicle 430, in accordance with the first leg of the predetermined route. When reaching Vehicle 430, the additional drone may deposit Package 420 on Vehicle 430, and fly. Package 420 may be transported by Vehicle 430 from the second location to the third location, in accordance with the second leg of the predetermined route. When reaching the third location, Drone 410 may collect Package 420 from Vehicle 430 and fly towards Vehicle 440 in accordance with the third leg of the route. When reaching Vehicle 440 at the fourth location, Drone 410 may deposit Package 420 to Vehicle 440 and fly. Package 420 may be transported by Vehicle 440 from the fourth location to the fifth location, in accordance with the fourth leg of the predetermined route.

Figure 5A:
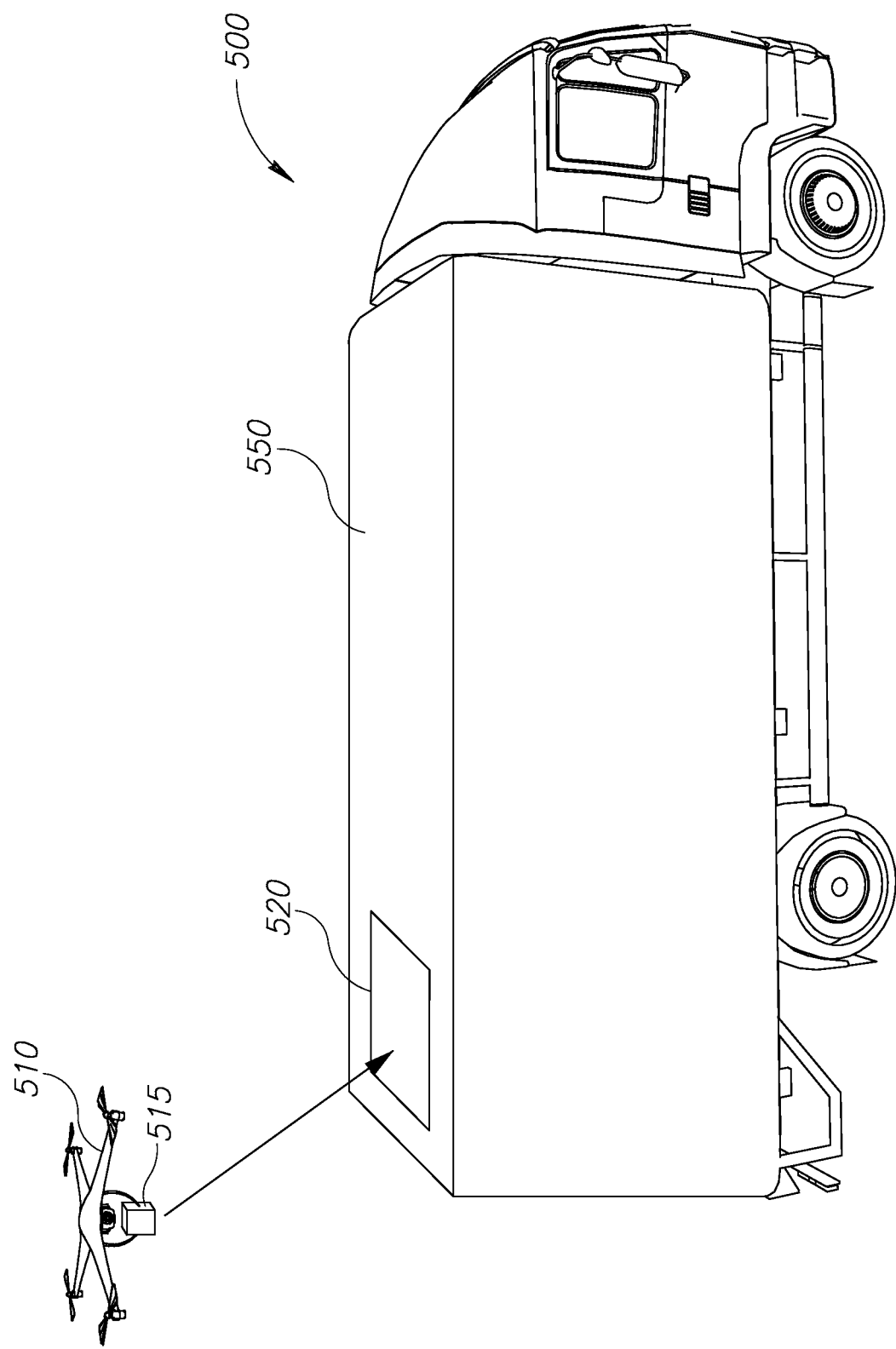
FIGS. 5A-5C show schematic illustrations of vehicles utilized by the disclosed subject matter, in accordance with some exemplary embodiments of the disclosed subject matter.

Referring now to FIG. 5A showing a schematic illustration of a vehicle utilized by the disclosed subject matter, in accordance with some exemplary embodiments of the disclosed subject matter.

In some exemplary embodiments, a Vehicle 500 may be adapted to transport a Drone 510 thereon. In some exemplary embodiments, Drone 510 may be delivering a Package 515. Vehicle 500 may not be actively participating in the delivery of Package 515. Vehicle 500 may be performing another task that is not related to the delivery of Package 515, such as publicly transporting passengers, private driving, or the like.

In some exemplary embodiments, a Landing Pad 520 may be located on a top of Vehicle 500. Landing Pad 520 may be adapted in size and shape to allow drones such as Drone 510 to land thereon.

In some exemplary embodiments, Landing Pad 520 may comprise an opening to a package repository (not shown). The package repository may be adapted in size and shape to retain a plurality of packages similar to Package 515. The package repository may be configured to store packages deposited by drones landing on Landing Pad 520 via the opening.

In some exemplary embodiments, Landing Pad 520 may be selectively mountable on Vehicle 500. Landing Pad 520 may be removable from Vehicle 500.

In some exemplary embodiments, Vehicle 500 may be designed to have a Driver Cabin 540 that is separated from a Cargo Area 520. Driver Cabin 540 may be an enclosed space where a driver of Vehicle 500 is seated. Driver Cabin 540 may be an integrated irremovable part of Vehicle 500. Cargo Area 520 may be an area for placing cargo or equipment in Vehicle 500. Cargo Area 520 may be removable from Vehicle 500. Additionally or alternatively, Cargo Area 520 may be an open load ben having no-roof.

In some exemplary embodiments, Landing Pad 520 may be located on a top of Driver Cabin 540. The driver of Vehicle 500 may or may not have an access to Landing Pad 520. Drone 510 may be configured to land on Landing Pad 520, regardless of Cargo Area 520 that may not necessarily be a permanent part of Vehicle 500'.

In some exemplary embodiments, Drone 510 may be identified by Landing Pad 520 or by the driver of Vehicle 500, and given a permission to land or handle packages. After being identified, Drone 510 may land on Landing Pad 520 and take a ride on Vehicle 500. Additionally or alternatively, Drone 510 may deposit Package 515 on Landing Pad 520. Package 515 may be transferred into a package repository attached to Landing Pad 520, or to Driver Cabin 540 where it may be handled by the driver. Package 515 may be delivered to its destination by Vehicle 500, collected by a different drone from Landing Pad 520, or the like.

Additionally or alternatively, Landing Pad 520 may be located on Cargo Area 520. In some exemplary embodiments, the total height of Cargo Area 520 when Landing Pad 520 is mounted thereon, may not exceed a predetermined height threshold defined by a structure of Vehicle 500 or Cargo Area 520.

Figure 5B:
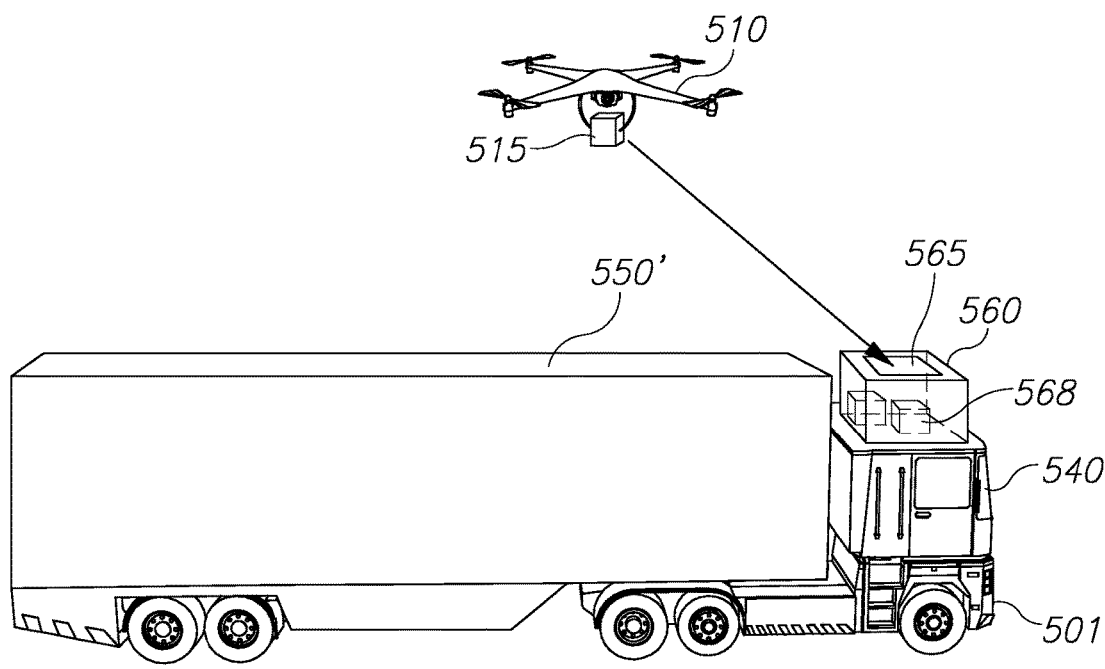

Referring now to FIG. 5B showing a schematic illustration of a vehicle utilized by the disclosed subject matter, in accordance with some exemplary embodiments of the disclosed subject matter.

In some exemplary embodiments, a Vehicle 501 may be a capable of transporting a package that is deposited and collected autonomously by one or more autonomous drones, without intervention of Vehicle 501 or a person riding thereon. As an example, Vehicle 501 may be capable of transporting Package 515 carried by Drone 510.

In some exemplary embodiments, Vehicle 501 may comprise a Driver Cabin 540 that is separated from a Cargo Compartment 550. Cargo Compartment 550 may be similar to Cargo Area 520 of FIG. 5A. Additionally or alternatively, Cargo Compartment 550 may be a vehicle-transported container that may be transported with Vehicle 501 or other vehicles. Cargo Compartment 550 may be designed to be separated from Vehicle 501, to be transported by additional vehicles, or the like.

In some exemplary embodiments, a Repository 560 may utilized to retain packages transported by Vehicle 501, after being deposited and before being collected autonomously by the one or more autonomous drones. Repository 560 may be mounted on the top of Driver Cabin 540. In some exemplary embodiments, Repository 560 may comprise an Opening 565. Opening 565 may be adapted in size and shape to allow depositing and collecting of a package by a drone, similar to Drone 510. Additionally or alternatively, Repository 560 may comprise a Storage Compartment 568. Compartment 568 may be adapted in size and shape to retain a plurality of packages, similar to Package 515. Storage Compartment 568 may be configured to store packages deposited via Opening 565.

In some exemplary embodiments, Repository 560 may comprise an opening (not shown) to Driver Cabin 540. A driver of Vehicle 501 may have access through the opening to packages stored by Repository 560.

It may be appreciated that Repository 560 may be selectively mountable on and removable from Vehicle 501.

In some exemplary embodiments, Repository 560 may replace a windshield of Driver Cabin 540. Repository 560 may protect Vehicle 501 occupants from wind and flying debris such as dust, insects, and rocks, and provide an aerodynamically formed window towards the front.

Figure 5C:
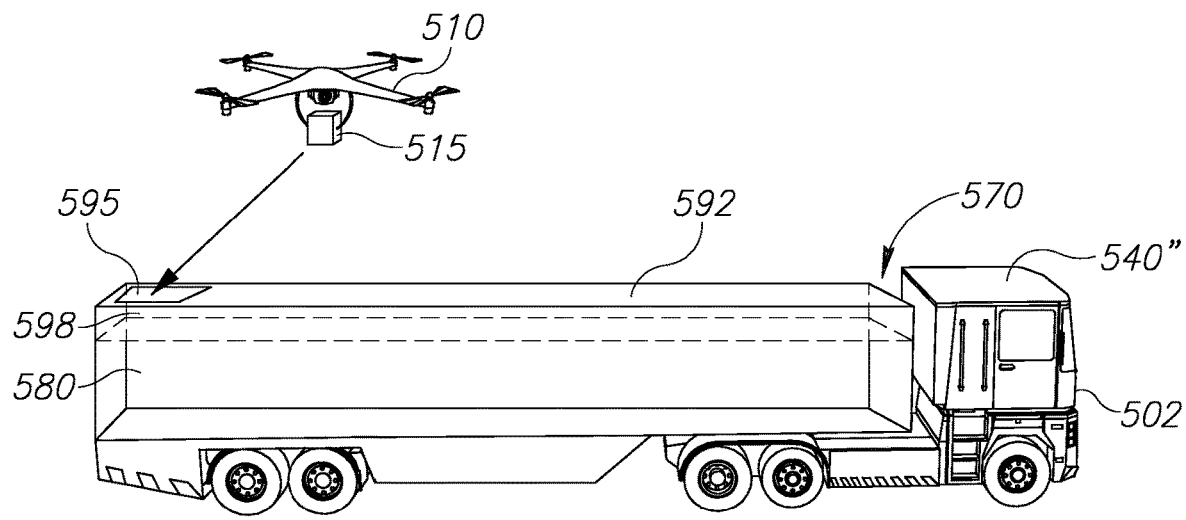

Referring now to FIG. 5C showing a schematic illustration of a vehicle utilized by the disclosed subject matter, in accordance with some exemplary embodiments of the disclosed subject matter.

In some exemplary embodiments, Vehicle 502 may be a vehicle transporting a Container 570. Vehicle 502 may comprise a Driver Cabin 540 that is separated from Container 570. Container 570 may be a vehicle-transported container that may be transported with Vehicle 502 or other vehicles. Container 570 may also be used across different modes of transport, such as ships, rails, or the like, without unloading and reloading their cargo. Container 570 may be used to store and transport materials and products efficiently and securely in global transport use, in regional use, or the like.

In some exemplary embodiments, Container 570 may comprise a Container Compartment 580. Container Compartment 580 may be used to store the original cargo of Container 580.

In some exemplary embodiments, Container 570 may comprise a Repository 590. Repository 590 may be mounted on the top of Container Compartment 580.

In some exemplary embodiments, Repository 590 may comprise an Opening 595. Opening 595 may be adapted in size and shape to allow depositing and collecting of a package by a drone, similar to Drone 510. Opening 595 may be located on a top of Repository 590 to allow the drone to collect or deposit the package from the top of Vehicle 501.

In some exemplary embodiments, Repository 590 may comprise a Storage Compartment 598. Storage Compartment 598 may be adapted in size and shape to retain a plurality of packages, similar to Package 515. Storage Compartment 598 may be configured to store packages deposited via Opening 595.

It may be appreciated that Repository 590 may be selectively mountable on and removable from Container 570 or permanently integrated with Container 570.

In some exemplary embodiments, a height of Container 570 may not exceed a predetermined height threshold defined by a structure of Vehicle 502. As an example, Vehicle 502 may be designed to transport high-cube containers of a fixed size of 9 feet 6 inches (2.9 m). Additionally or alternatively, a total height of Container 570 may be of a standard height of a standard vehicle-transported container. In such a case, Container Compartment 580 may be of a height below a standard height of a container compartment of the standard vehicle-transported container. Such that Container Compartment 580 with Repository 590 mounted there above, will not exceed the standard height of a standard vehicle-transported container.

Figure 6A:
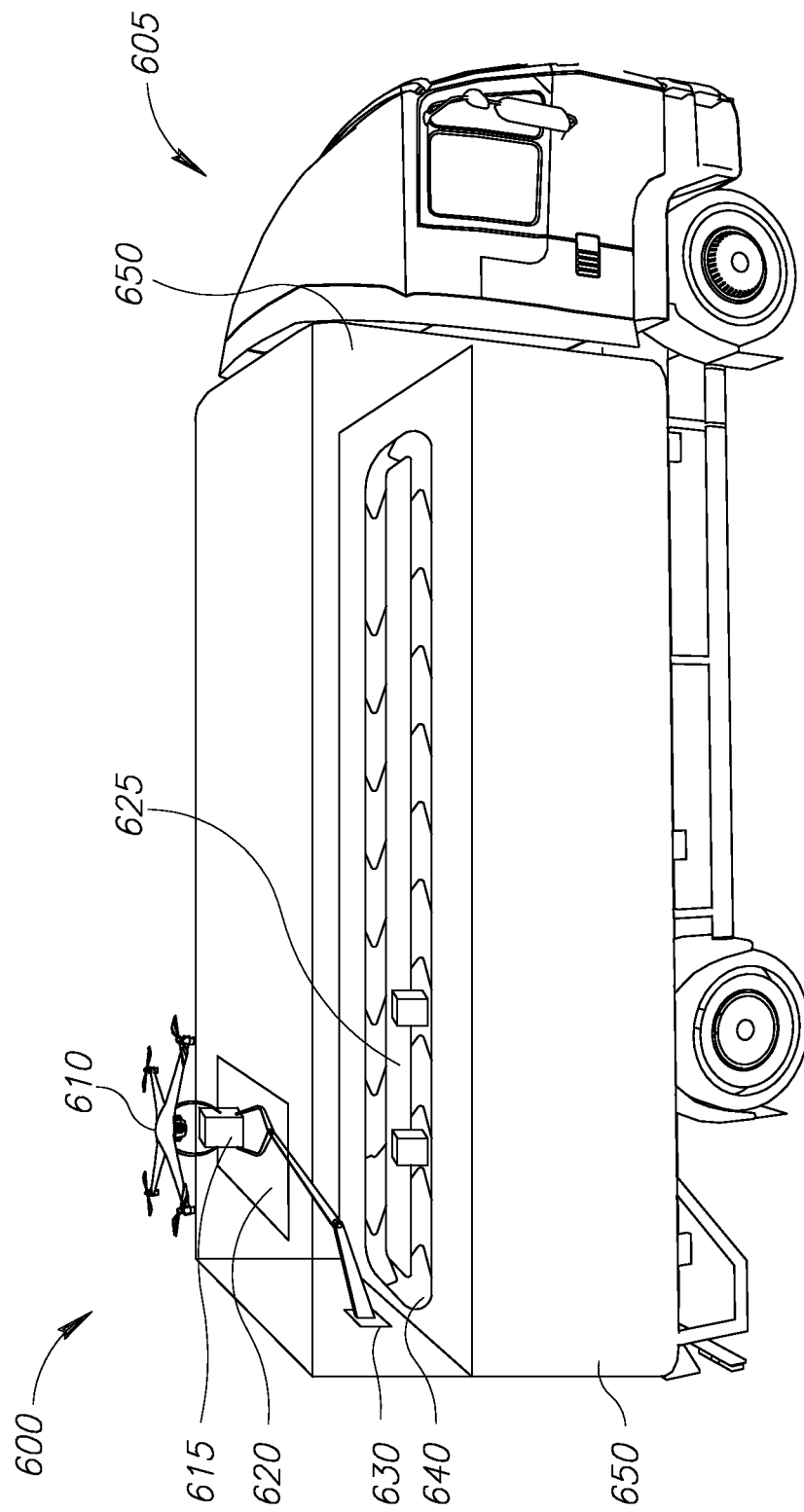
FIGS. 6A-6B show schematic illustrations of repositories, in accordance with some exemplary embodiments of the disclosed subject matter.

Referring now to FIG. 6A showing a schematic illustration of a repository, in accordance with some exemplary embodiments of the disclosed subject matter.

A Repository 600 may be a vehicle-associated package repository. Repository 600 may be transported by a Vehicle 605. Vehicle 605 may be a motor vehicle designed to transport cargo, such as a truck. Repository 600 may be mounted on Vehicle 605, integrated with Vehicle 605, carried by Vehicle 605, or the like.

In some exemplary embodiments, Repository 600 may be utilized for automatic storage of packages. The storage facility may be adapted for drones, such as Drone 610, to connect thereto for collecting or depositing of packages thereon.

In some exemplary embodiments, Repository 600 may comprise an Opening 620. Opening 620 may be adapted in size and shape to allow depositing and collecting of a package by a Drone 610, such as Package 615. As an example, packages carried by drones are of a size of about 50 cm×50 cm×50 cm and a weight of about 3 kg. In some exemplary embodiments, Opening 620 may be located on a top of Repository 600, in order to allow drones such as Drone 610 to collect or deposit the package from the top of Vehicle 605.

In some exemplary embodiments, Opening 620 may be configured to operate as a landing pad for drones like Drone 610, while waiting to collect a package or before depositing a package. Additionally or alternatively, drones like Drone 610 may not ride on Vehicle 605, and accordingly may not land on Repository 600.

In some exemplary embodiments, a Storage Compartment 650 may be located in an inner part of Repository 600. As an example, Storage Compartment 650 may be located inside the cargo are of Vehicle 605, inside a container transported by Vehicle 605, or the like. Storage Compartment 650 may be adapted in size and shape to retain a plurality of packages, such as Package 615 and Package 625. Storage Compartment 650 may be configured to store packages deposited via said Opening 620, such as Package 615.

It may be appreciated that an Original Storage Compartment 608 of Vehicle 605 may be utilized for the original task of Vehicle 605. Original Storage Compartment 608 may be separated from Storage Compartment 650.

In some exemplary embodiments, Repository 600 may comprise a displacement component, such as a Handle 630. Handle 630 may be adapted in size and shape to move one or more packages from Opening 620 to Storage Compartment 650 upon package deposit. Handle 630 may be adapted in size and shape to move one or more packages from Storage Compartment 650 to Opening 620 upon package collection. Additionally or alternatively, the displacement component may be positioned within Storage Compartment 650, or other parts of Repository 600, and may be utilized to collect packages dropped via Opening 620 from drones, or to pass packages towards Opening 620, collect packages from Handle 630, provide packages to Handle 630, or the like.

In some exemplary embodiments, packages within Repository 600 may be moved on a Conveyor Belt 640. Conveyor Belt 640 may move in a loop inside Storage Compartment 650 and collect packages provided to Storage Compartment 650 by Handle 630, provide packages from Storage Compartment 650 to Handle 630 in order to be returned back to Opening 620, or the like. Additionally or alternatively, Conveyor Belt 640 may operate without Handle 630. Packages may be dropped via Opening 620 directly on Conveyor Belt 640 and move into Storage Compartment 650.

Additionally or alternatively, Conveyor Belt 640 may replace Storage Compartment 650, or be an integrated portion thereof.

In some exemplary embodiments, Drone 610 may arrive to Repository 600 and identify itself. A component of Repository 600, such as a reader in Opening 620 (not shown), Handle 630, or the like, may be configured to identify Drone 610 or Package 615, and permit depositing Package 615 in Repository 600. Additionally or alternatively, Drone 610 may be configured to identify Vehicle 605 instead of or in addition to Repository 600. Drone 610 may deposit Package 615 via Opening 620, by handing it to Handle 630, by placing it on Conveyor Belt 640 or any other displacement component of Repository 600. In some exemplary embodiments, Handle 630 may move Package 615 to Storage Compartment 650, where Package 615 can be stored until being collected by a different drone.

Additionally or alternatively, Drone 610 or a different drone may arrive to Repository 600 and identify itself. A component of Repository 600 may be configured to identify Drone 610, and recognize which package from the packages stored in Repository 600 may be delivered thereto, such as Package 625. Package 625 may be moved from Storage Compartment 650 on Conveyor Belt 640 and to be provided to Opening 620 such as by Handle 630. When Package 625 arriving to Opening 620, Drone 610 may be configured to identify Package 625 and collect it.

In some exemplary embodiments, additional displacement methods may be used to move packages within Repository 600. As an example, an autonomous robot may take the package and move it to the designated location within Storage Compartment 650.

As another example, in case a drone is identified to be permitted to collect a package, such as Package 625, the displacement component may pass Package 625 from Storage Compartment 650 to Opening 620, whereby the drone can collect Package 625 from the opening. In some cases, Conveyor Belt 640 may move Package 625 towards Handle 630. Handle 630 may collect Package 625 from Conveyor Belt 640 and handle it to the drone. Additionally or alternatively, Conveyor Belt 640 may move Package 625 until Package 625 being below Opening 620. A portion of Conveyor Belt 640 that is carrying Package 625 may go higher until reaching Opening 620, whereby the drone can collect Package 625 therefrom.

In some exemplary embodiments, Repository 600 may not include any moving mechanical parts. Repository 600 may comprise an array of slots that can retain the packages, and are accessible to the drones, such as from above. The drone may fit inside a cell that is designated for the package and deposit the package directly in the cell. When a drone wishes to collect a package, it may similarly access the relevant cell directly to pick up the package.

Figure 6B:
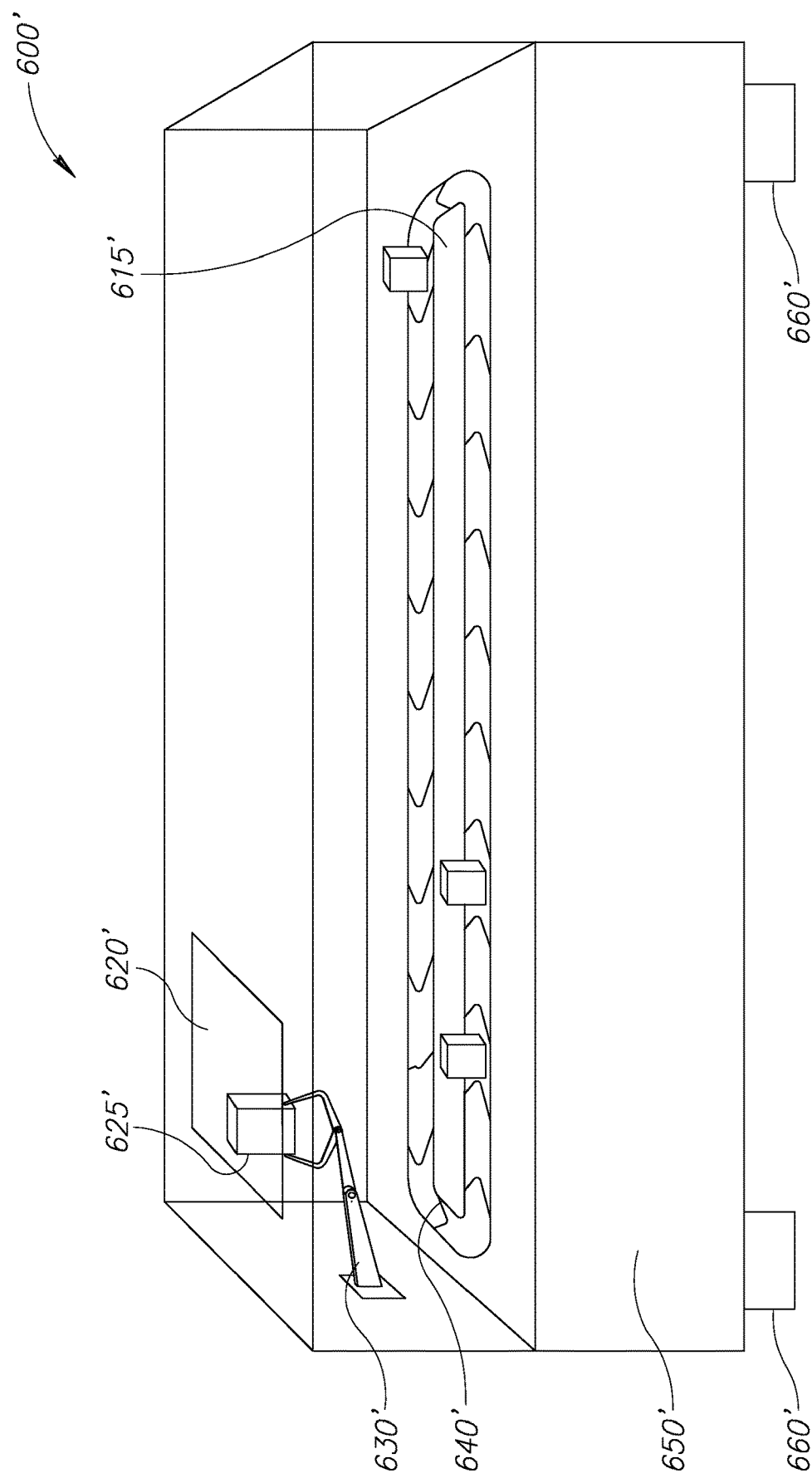

Referring now to FIG. 6B showing a schematic illustration of a repository, in accordance with some exemplary embodiments of the disclosed subject matter.

A Mountable Repository 600' may be a mountable vehicle-associated package repository for automatic storage of packages. Mountable Repository 600' may be adapted for drones to connect thereto for collecting or depositing of packages thereon. In some exemplary embodiments, Mountable Repository 600' may be constructed as an extension to be mounted on a top of a vehicle in order to store packages therein. Mountable Repository 600' may be designated to be transported by a vehicle, to be selectively mountable on a vehicle, to be mounted on a vehicle-transported container, or the like. Mountable Repository 600' may be removable from the vehicle.

In some exemplary embodiments, one or more Mounting Means 660 may be utilized to attach Mountable Repository 600' to the vehicle.

In some exemplary embodiments, Mountable Repository 600' may be configured to be mounted on a cargo area of a vehicle. In other exemplary embodiments, Mountable Repository 600' may be configured to be mountable on a driver cabin of a vehicle, on a removable container carried by a vehicle, or the like. (Such as depicted in FIGS. 5B-5C).

It may be appreciated that a height of Mountable Repository 600', when mounted on a vehicle, may not exceed a predetermined height threshold defined by a structure of the vehicle.

Mountable Repository 600' may be adapted to retain packages of limited size, such as of size up to 30 cm×30 cm×30 cm, 50 cm×50 cm×50 cm, 70 cm×70 cm×70 cm, or the like. In some exemplary embodiments, Mountable Repository 600' may be further used as a landing pad of drones. Additionally or alternatively, a landing pad may be placed on the top of the Mountable Repository 600'.

In some exemplary embodiments, Mountable Repository 600' may be designed to be relatively flat in order to minimize the potential adverse effect on the vehicle's aerodynamics.

Additionally or alternatively, Mountable Repository 600' may be designated to be integrated in a vehicle-transported container. The vehicle-transported container may be used as a transport and storage unit for moving products and raw materials between locations or countries. The vehicle-transported container may comprise, in addition to Repository 600', a container compartment. The container compartment may be used for the original task of the vehicle-transported container, and may or may not be related to Repository 600'. In some exemplary embodiments, Repository 600' may be positioned above the container compartment. A total height of the vehicle-transported container may be of a standard height of a standard vehicle-transported container, such as 8 feet 6 inches (2.6 m) for regular containers and 9 feet 6 inches (2.9 m) for High Cube containers. Additionally or alternatively, the container compartment may be of a height below a standard height of a container compartment of the standard vehicle-transported container.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A delivery method comprising:
    obtaining, by a processor, a delivery data of a package, wherein the delivery data comprises an origin and a destination of the package;
    obtaining, by the processor, a schedule of a plurality of vehicles, wherein the schedule comprises a schedule of each vehicle of the plurality of vehicles, wherein each vehicle of the plurality of vehicles is capable of transporting a package that is deposited and collected autonomously by one or more autonomous drones without intervention of the each vehicle or person riding thereon, wherein vehicles of the plurality of vehicles are not actively participating in a delivery of the package, wherein each vehicle of the plurality of vehicles is performing another task that is independent from the delivery of the package; and determining, by the processor, based on the schedule and the delivery data, a route for delivering the package, whereby improving a drone-based delivery of the package;

controlling, via at least one processor, the one or more drones to follow at least a portion of the route, wherein the route begins at the origin, wherein the route ends at the destination, wherein the route comprises a plurality of legs, wherein the plurality of legs comprises a first leg, a second leg and a third leg, wherein in the first leg, the package is planned to be transported by a first drone to a vehicle, wherein in the second leg, the package is planned to be transported on the vehicle, independently of any drone, and wherein in the third leg, the package is planned to be transported from the vehicle by a second drone.

2. The method of claim 1, wherein the first drone and the second drone are different drones, wherein each different drone is local to a different area.

3. The method of claim 2, wherein the one or more drones are adapted in capabilities for the different areas.

4. The method of claim 1 further comprising: transporting the package in accordance with the route.

5. The method of claim 1, wherein the first drone and the second drone are not transported by the vehicle during the second leg.

6. The method of claim 1, wherein the plurality of legs further comprises a fourth leg and a fifth leg, wherein in the third leg, the package is planned to be transported by the second drone from the vehicle to a second vehicle; wherein in the fourth leg, the package is planned to be transported on the second vehicle, independently of any drone; wherein in the fifth leg, the package is planned to be transported from the second vehicle by a third drone.

* * * * *